United States Patent
Ito et al.

(10) Patent No.: US 10,323,689 B2
(45) Date of Patent: Jun. 18, 2019

(54) SLIDE MEMBER AND METHOD FOR PRODUCING SAME

(71) Applicants: Yoshinori Ito, Aichi (JP); Takahiro Gotou, Aichi (JP); Fuminori Satoji, Aichi (JP)

(72) Inventors: Yoshinori Ito, Aichi (JP); Takahiro Gotou, Aichi (JP); Fuminori Satoji, Aichi (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/511,722

(22) PCT Filed: Sep. 17, 2015

(86) PCT No.: PCT/JP2015/076545
§ 371 (c)(1),
(2) Date: Mar. 16, 2017

(87) PCT Pub. No.: WO2016/043284
PCT Pub. Date: Mar. 24, 2016

(65) Prior Publication Data
US 2017/0298986 A1    Oct. 19, 2017

(30) Foreign Application Priority Data

Sep. 19, 2014  (JP) ................................ 2014-191487
Sep. 24, 2014  (JP) ................................ 2014-193833
(Continued)

(51) Int. Cl.
*F16C 33/10*     (2006.01)
*B22F 1/02*      (2006.01)
(Continued)

(52) U.S. Cl.
CPC ................. *F16C 33/10* (2013.01); *B22F 1/02* (2013.01); *B22F 3/162* (2013.01); *B22F 5/106* (2013.01);
(Continued)

(58) Field of Classification Search
CPC ...... B22F 1/02; B22F 3/24; B22F 5/00; B22F 7/00; B22F 2998/10; B22F 7/062;
(Continued)

(56) References Cited

U.S. PATENT DOCUMENTS 3,343,953 A    9/1967  Schladitz
4,221,828 A *  9/1980  Sato ....................... B22F 1/025
                                                      427/217
(Continued)

FOREIGN PATENT DOCUMENTS

EP    0 872 296    10/1998
JP    54-112308    9/1979
(Continued)

OTHER PUBLICATIONS

Machine Translation of JP S63-76808 (translated Mar. 19, 2018] (Year: 1988).*
(Continued)

*Primary Examiner* — David Sample
*Assistant Examiner* — Elizabeth Collister
(74) *Attorney, Agent, or Firm* — Wenderoth, Lind & Ponack, L.L.P.

(57) ABSTRACT

Raw material powder containing metal powder as a main component is molded to form a metal powder molded body (3'), and the metal powder molded body (3') is sintered to form a metal substrate (3). Further, a lubricating member (4) is made of an aggregate of graphite particles (13), and at least a part of a bearing surface (11) is formed of the fabricating member (4). The lubricating member (4) is fitted
(Continued)

into the metal powder molded body (3'). After that, the metal powder molded body (3') is sintered, and at this time, the lubricating member (4) is fixed onto the metal substrate (3) with a contraction force (F) generated in the metal powder molded body (3').

2 Claims, 19 Drawing Sheets

(30) Foreign Application Priority Data

| | | |
|---|---|---|
| Dec. 26, 2014 | (JP) | 2014-265215 |
| Aug. 18, 2015 | (JP) | 2015-161126 |
| Aug. 26, 2015 | (JP) | 2015-166754 |

(51) Int. Cl.

| | |
|---|---|
| *B22F 3/16* | (2006.01) |
| *B22F 5/10* | (2006.01) |
| *F16C 33/14* | (2006.01) |
| *F16C 33/16* | (2006.01) |
| *F16C 33/26* | (2006.01) |
| *B22F 7/06* | (2006.01) |
| *C22C 32/00* | (2006.01) |

(52) U.S. Cl.
CPC .......... *F16C 33/1095* (2013.01); *F16C 33/14* (2013.01); *F16C 33/16* (2013.01); *F16C 33/26* (2013.01); *B22F 7/062* (2013.01); *B22F 2998/10* (2013.01); *C22C 32/0084* (2013.01); *F16C 2204/10* (2013.01); *F16C 2220/20* (2013.01)

(58) Field of Classification Search
CPC .............. B22F 1/0059; B22F 2003/023; B22F 2003/166; B22F 3/10; B22F 3/162; B22F 5/106; F16C 33/10; F16C 33/14; F16C 33/16; F16C 2204/10; F16C 2220/20; F16C 33/1095; F16C 33/26; C22C 32/0084

See application file for complete search history.

(56) References Cited

U.S. PATENT DOCUMENTS

| | | |
|---|---|---|
| 5,415,791 A | 5/1995 | Chou et al. |
| 6,015,775 A | 1/2000 | Takayama et al. |
| 2004/0091732 A1* | 5/2004 | Sato .......................... B22F 7/04 428/548 |

FOREIGN PATENT DOCUMENTS

| | | |
|---|---|---|
| JP | 63-76808 | 4/1988 |
| JP | 5-320681 | 12/1993 |
| JP | 6-32812 | 4/1994 |
| JP | 6-184572 | 7/1994 |
| JP | 8-332562 | 12/1996 |
| JP | 2000-266056 | 9/2000 |
| JP | 2003-260596 | 9/2003 |
| JP | 2010-175002 | 8/2010 |
| JP | 2013-14645 | 1/2013 |
| JP | 2013-92222 | 5/2013 |

OTHER PUBLICATIONS

International Preliminary Report on Patentability and Written Opinion of the International Searching Authority dated Mar. 21, 2017 in corresponding International Application No. PCT/JP2015/076545.
International Search Report dated Dec. 15, 2015 in International Application No. PCT/JP2015/076545.
Extended European Search Report dated Apr. 20, 2018 in European Application No. 15842943.1.

* cited by examiner

SLIDE MEMBER AND METHOD FOR PRODUCING SAME

TECHNICAL FIELD

The present invention relates to a sliding member and a method of manufacturing the sliding member.

BACKGROUND ART

A sintered bearing, which is a kind of sliding member, is obtained by impregnating lubricating oil into a porous metal body produced by a powder metallurgical process. The lubricating oil retained in inner pores of the bearing seeps out from the inside of the bearing to a bearing surface serving as a sliding surface due to the action of a pump and heat generation in association with the rotation of a shaft, to thereby form a lubricating oil film on the bearing surface (for example, Patent Literature 1).

CITATION LIST

Patent Literature 1: JP 2010-175002 A
Patent Literature 2: JP 2013-14645 A
Patent Literature 3: JP 06-32812 U
Patent Literature 4: JP 2000-266056 A

SUMMARY OF INVENTION

Technical Problem

In recent years, there has been a demand for a sintered bearing that can be used even under a severe condition, such as high contact pressure or high temperature. However, an existing sintered bearing is liable to be brought into contact with a metal due to the breakage of the lubricating oil film under high contact pressure, and the lubricating oil is liable to be degraded early under high temperature. Therefore, there is a problem in that it is difficult to obtain stable lubricity. Therefore, in Patent Literature 1, there is proposed that the composition and characteristics of the lubricating oil to be impregnated into the sintered bearing are improved to increase the strength of the lubricating oil film, to thereby enable the sintered bearing to be used even under high contact pressure. However, as long as the lubricating oil mainly contributes to a lubricating function, there is a limit to the use of the sintered bearing under the severe condition. Further, there is also a problem in that the sintered bearing impregnated with the lubricating oil as in Patent Literature 1 cannot be used in an environment that avoids the mixing of the lubricating oil.

Meanwhile, in the sintered bearing as disclosed in Patent Literature 1, in order to compensate for the lubricity of the bearing surface, a solid lubricant, such as graphite, is generally blended, with metal powder. However, when the blending amount of the solid lubricant powder is increased excessively in order to enhance the lubricity, there is a problem, for example, in that the binding between metal particles is inhibited to decrease the strength of a material. Therefore, there is a limit to an increase in amount of the solid lubricant powder.

In view of the foregoing, a first object of the present invention is to provide a sliding member, which has low cost and is capable of maintaining stable lubricating performance even when being used in a special environment, such as a severe environment, and a method of manufacturing the sliding member.

Further, in Patent Literature 2, there is disclosed a sliding member in which a lubricating member is embedded in a sliding surface of a cylindrical substrate. In Patent Literature 2, as an example of the lubricating member, there is given a fired body containing artificial graphite as a main component. A through hole in a radial direction is formed in the cylindrical substrate of the sliding member, and the lubricating member is fitted, into the through hole to be bonded and fixed thereto.

However, with such sliding member, it is necessary to fix the lubricating member onto the substrate with high accuracy, and hence it takes time and labor to perform the fixing operation. Further, it is necessary to process the through hole of the substrate and an outer peripheral surface of the lubricating member to be fitted into the through hole with high accuracy. Therefore, the processing cost increases. In particular, when a carbon-based fired body is used as the lubricating member, the carbon-based fired body is not easily deformed plastically, and hence shaping, such as cutting processing, is required in order to increase the dimensional accuracy, with the result that the processing cost farther increases.

Further, in Patent Literature 3, there is disclosed an internal gear pump for supplying gasoline as illustrated in FIG. 31. The gear pump includes an inner rotor 161, a main body 162 including a fixing shaft 162a inserted into an inner periphery of the inner rotor 161, and an outer rotor 163 that is engaged with the inner rotor 161 and is arranged so as to toe eccentric with respect to the inner rotor 161. When the outer rotor 163 is rotated with a drive unit, the inner rotor 161 is rotated, and the outer rotor 163, the inner rotor 161, and the main body 162 cooperate with each other to exhibit pumping action.

The inner rotor 161 arranged in the gear pump is rotated while sliding with the fixing shaft 162a inserted into the inner periphery of the inner rotor 161, and hence the inner rotor 161 is required to have lubricity. However, the inner rotor 161 is brought into contact with gasoline, and hence lubricating oil that contaminates gasoline cannot be used. Therefore, the inner rotor 161 may be used in a state in which a carbon ring 164 is press-fitted into the inner periphery of a substrate of the inner rotor 161.

Even in the inner rotor 161, it takes time and labor to perform the operation of press-fitting the carbon ring 164 into the inner periphery of the substrate, and it is necessary to process the substrate and the carbon ring 164 with high accuracy. Therefore, manufacturing cost increases.

In view of the foregoing, a second object of the present invention is to increase the productivity of the sliding member using a carbon-based fired body and to reduce the manufacturing coat.

Further, a lubricating member having a sliding surface mainly made of graphite is used as, for example, a rotor and a vane for a vacuum pump, a bearing to be used in a high-temperature environment exceeding 200° C. or a bearing for a construction machine. Such lubricating member is manufactured by subjecting raw material powder mainly containing graphite particles to compression molding to form compact and sintering the compact. However, the graphite particles themselves are hardly deformed plastically. Therefore, when a large part of the raw material powder is made of the graphite particles, the raw material powder cannot be solidified by compression molding, and a compact cannot be formed. Therefore, in general, when a compact containing graphite as a main component is formed, raw material powder containing a mixture of graphite particles and a binding agent, such as tar pitch or coal tar, is used (see, for example, Patent Literature 4).

However, in order to form a compact by the above-mentioned method, it is necessary that the raw material powder contain about 50 wt % of the binding agent (see paragraph [0010] of Patent literature 4). Therefore, the binding agent is decomposed during sintering to generate a large amount of decomposed gas, causing problems of contamination of a sintering furnace and exhaust gas. In order to alleviate the problems, it is necessary to perform sintering slowly over a long time period, resulting in a substantial decrease in productivity.

In view of the foregoing, a third object of the present invention is to increase the productivity of the lubricating member having the sliding surface mainly made of graphite.

Solution to Problem

According to a first invention of the present application, there is provided a sliding member having a sliding surface that slides with a mating member, comprising: a metal substrate, which is formed by sintering raw material powder containing metal powder as a main component; and a lubricating member, which is made of an aggregate of solid lubricant particles, wherein at least a part of the sliding surface is formed of the lubricating member, and wherein the lubricating member is fixed onto the metal substrate toy a sintering operation of sintering the raw material powder.

In the above-mentioned configuration, the lubricating member formed in at least a part of the sliding surface serves as a supply source of a solid lubricant. The solid lubricant supplied from the lubricating member permeates to the entire sliding surface due to the relative sliding with respect to the mating member, and hence a lubricating effect can be obtained on the entire sliding surface. Further, in the sliding member, the mating member does not always slide with the entire sliding surface, and a limited partial region of the sliding surface may slide with the mating member. In this case, the mating member can be allowed to slide always with the lubricating member by designing the position and shape of the lubricating member so that the lubricating member is positioned in a sliding region with respect to the mating member or adjusting the setting posture of the sliding member so that the lubricating member is positioned in the sliding region. Further, when the area of the lubricating member that appears on the sliding surface is increased, the lubricating effect can be enhanced. Also in this case, the binding force between the metal particles does not decrease unlike the related-art produce, and hence a decrease in strength of the sliding member can be avoided.

Meanwhile, when the lubricating member is arranged only in a partial region of the sliding surface as described above, there is a problem regarding how to fix the lubricating member onto the metal substrate serving as a base. In order to address the problem, the present invention adopts the following new technical means: the lubricating member is fixed onto the metal substrate by the sintering operation at a time of sintering the metal substrate. When the lubricating member is fixed onto the metal substrate by the sintering operation required in the course of manufacturing of the sliding member, it is not necessary to perform a fixing operation in a step that is not related to the original step of manufacturing a sintered metal, such as press-fitting and bonding. Therefore, the sliding member can be subjected to near-net-shape molding, and the cost of the sliding member can be reduced.

As an example of the structure in which the lubricating member is fixed onto the metal substrate, it is conceivable that the lubricating member and the metal substrate are brought into an interference fit state with a contraction force generated in the metal substrate along with the sintering operation.

In this case, the lubricating member may be formed by firing powder containing solid lubricant powder and a binder.

The lubricating member may also be formed by sintering, through the sintering operation, coated powder formed by coating solid lubricant powder with a metal. In this case, as another example of the structure in which the lubricating member is fixed onto the metal substrate, it is conceivable that the lubricating member and the metal substrate are bound to each other by diffusing the metal of the coated powder to the metal powder forming the metal substrate.

When the sliding surface is subjected to siring, the sliding surface with high accuracy can be obtained at low cost. The sizing may be performed with respect to only one of the metal substrate and the lubricating member, instead of both the metal substrate and the lubricating member. Surfaces other than, the sliding surface, as well as the sliding surface, may be subjected to sizing as necessary. Sizing itself is generally performed even in an existing sliding member made of a sintered metal, and hence the cost is not increased even when such treatment is performed.

The above-mentioned sliding member may be manufactured by: firing powder containing solid lubricant powder and a binder, to thereby form a lubricating member; molding raw material powder containing metal powder as a main component to form a molded body, and bringing the lubricating member into contact with the molded body so that a part of the lubricating member appears on a surface to be the sliding surface; and heating the lubricating member and the molded body at a sintering temperature under a state in which the lubricating member is brought into contact with the molded body, to thereby form the metal substrate by sintering of the molded body, and fix the lubricating member onto the metal substrate with a contraction force generated in the molded body during the sintering.

Further, the sliding member may also be manufactured by: molding first powder containing, as a main component, coated powder formed by coating solid lubricant powder with a metal and second powder containing metal powder as a main component so that the first powder appears on a surface to be the sliding surface under a state in which filling regions of the first powder and the second powder are divided, to thereby form a molded body; heating the molded body at a sintering temperature, to thereby form a lubricating member by sintering of the first powder, and form a metal substrate by sintering of the second powder; and diffusing, during the sintering operation, the metal of the coated powder contained in the first powder into the metal powder of the second powder, to thereby fix the lubricating member onto the metal substrate.

When the sliding surface is subjected to sizing after the lubricating member is fixed onto the metal substrate, the sliding surface with high accuracy can foe obtained at low cost.

According to a second invention of the present application, there is provided a sliding member having a sliding surface that slides with a mating member, the sliding member comprising: a carbon-based fired body which contains carbon as a main component and forms at least a part of the sliding surface; and a resin substrate which is an injection-molded product of a resin including the carbon-based fired body as an insert component and is integrated with the carbon-based fired body. The sliding member may be manufactured through a fired body forming step of subjecting raw material powder containing carbon-based powder as a main component to compression molding to form a compact and firing the compact to form a carbon-based fired body that forms at least a part of the sliding surface, and an insert molding step of performing injection molding with a resin through use of the carbon-based fired body as an insert component, to thereby form a resin substrate integrated with the carbon-based fired body.

As described above, in the sliding member according to the present invention, the carbon-based fired body and the resin substrate are integrated with each other by performing injection molding with a resin through use of the carbon-based fired body as an insert component. With this, the step of fixing the carbon-based fired body and the resin substrate onto each other is not required. Therefore, the number of steps is reduced and the productivity is increased. Further, it is not necessary to form a through hole for mounting the carbon-based fired body onto the resin substrate, and it is not necessary to form the carbon-based fired body with high accuracy so that the carbon-based fired body is fitted into the through hole. Therefore, the manufacturing cost is reduced.

In the above-mentioned sliding member, when an integrated product of the carbon-based fired body and the resin substrate is subjected, to sizing, the dimensional accuracy (in particular, the surface accuracy of the sliding surface) in the state of the integrated product can be enhanced, in particular, when the sliding member comprises a plurality of carbon-based fired bodies that are formed separately, the sliding surface of each carbon-based fired body in the integrated product can be arranged at a predetermined position (for example, on the same cylindrical surface) by subjecting the integrated, product of the plurality of carbon-based fired bodies and the resin substrate to sizing.

When oil is impregnated into inner pores of the carbon-based fired body in the above-mentioned sliding member, the oil seeps out to the sliding surface, to thereby further enhance the lubricity. In this case, the oil may be impregnated into the inner pores of the carbon-based fired body by, for example, immersing the integrated product of the carbon-based fired body and the resin substrate into the oil.

In the above-mentioned sliding member, it is preferred that, for example, a resin containing a crystalline resin as a main component be used as the resin forming the resin substrate.

The above-mentioned sliding member can be used as, for example, a bearing or a gear wheel having a sliding surface on an inner peripheral surface. Specifically, the sliding member can be used as, for example, a gear wheel for a fuel pump having a sliding surface that slides with an outer peripheral surface of a shaft on an inner peripheral surface and having a tooth surface on an outer peripheral surface.

According to a third invention of the present application, there is provided a method of manufacturing a lubricating member in which graphite particles occupy the largest area of the sliding surface, the method comprising: a compacting step of subjecting raw material powder that contains the graphite particles having binder metal powder adhering thereto to compression molding, to thereby provide a compact; and a sintering step of sintering the compact at a temperature equal to or less than the melting point of the binder metal powder, to thereby bind the binder metal powder to each other.

Through the above-mentioned manufacturing method, the lubricating member can be obtained in which the graphite particles occupy the largest area of the sliding surface and in which the binder metal adheres to each graphite particle and the binder metal is bound to each, other by sintering.

As described above, in the lubricating member of the present invention, the binder metal is interposed between the graphite particles contained in the raw material powder through use of the raw material powder containing the graphite particles having the binder metal adhering thereto. With this, the binder metal is deformed plastically during compression molding, to thereby solidify the raw material powder, with the result that the compact can be formed. Further, when the binder metal adhering to each graphite particle is bound to each other by sintering, the graphite particles can be bound to each other through the binder metal. Thus, a binding agent of the raw material powder can be omitted (or reduced). Therefore, the generation of decomposed gas during sintering is suppressed, and the sintering time can be shortened to increase the productivity.

Advantageous Effects of Invention

According to the first invention of the present application, the sliding member having high lubricating performance can be provided at low cost. This sliding member enables high lubricating performance to be obtained even in a special environment, for example, a severe environment, such as high temperature, high contact pressure, and high-speed rotation, or an environment in which it is difficult to use lubricating oil.

According to the second invention of the present application, the productivity of the sliding member using the carbon-based fired body can be increased, and the manufacturing cost can be reduced.

According to the third indention of the present application, the productivity of the lubricating member having the sliding surface mainly made of graphite can be increased.

DESCRIPTION OF EMBODIMENTS

Now, a sintered bearing is exemplified as an example of a sliding member according to a first invention of the present application, and the details thereof are described with reference to FIG. 1 to FIG. 15.

Figure 1A:
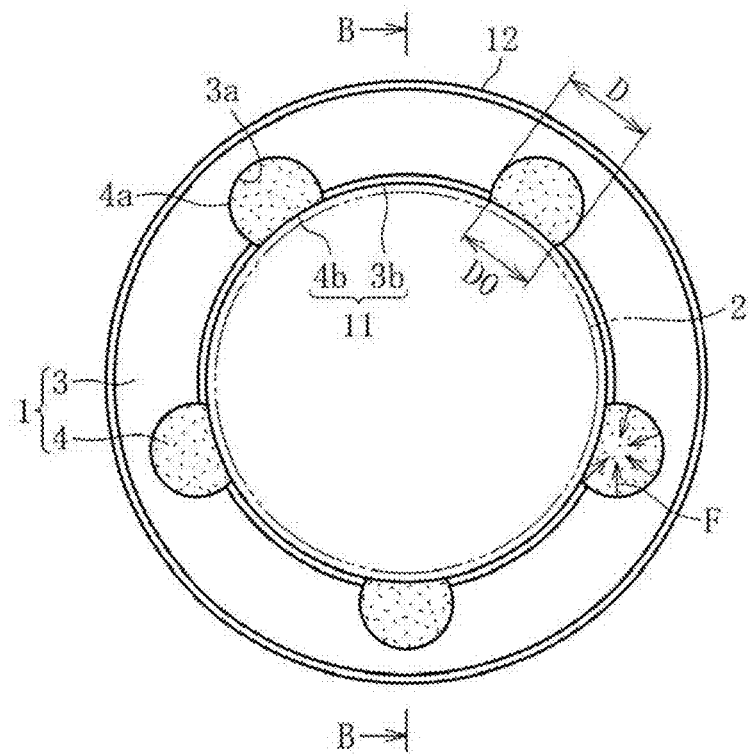
FIG. 1A is a front view of a sintered bearing according to a first embodiment of a first invention of the present application.
Figure 1B:
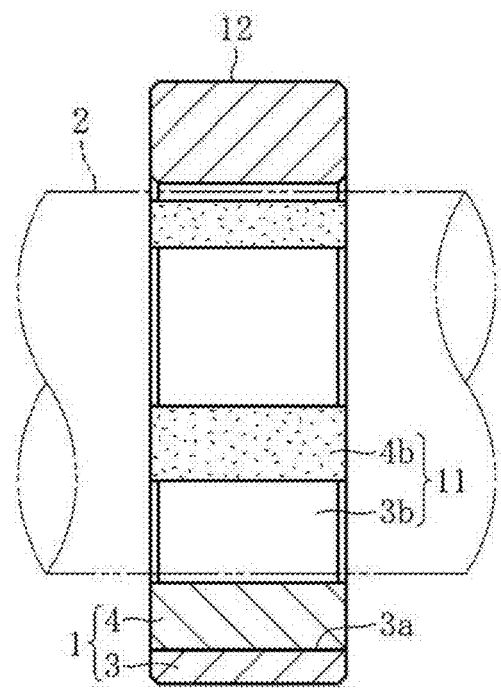
FIG. 1B is a sectional view taken along the line B-B of the sintered bearing of FIG. 1A.

As illustrated in FIG. 1A and FIG. 1B, a sintered bearing 1 has a cylindrical shape, and a bearing surface 11 having a cylindrical surface shape serving as a sliding surface is formed on an inner periphery of the sintered bearing 1. When a shaft 2 (represented by the alternate long and two short dashed line) serving as a mating member is inserted into the inner periphery of the sintered bearing 1, the shaft 2 is supported by the bearing surface 11 in a rotatable manner. When the shaft 2 is used as a rotation shaft, an outer peripheral surface 12 of the sintered bearing 1 is fixed onto an inner peripheral surface of a housing (not shown) by means of, for example, press-fitting or bonding. The shaft 2 may also be set to a stationary side instead of being set to a rotation side as described above, and the sintered bearing 1 may be set to the rotation side.

The sintered bearing 1 illustrated in FIG. 1A and FIG. 1B comprises a metal substrate 3, which is made of a sintered metal, and lubricating members 4, each of which is made of an aggregate of a large number of graphite particles. The metal substrate 3 comprises retaining parts 3a configured to retain the lubricating members 4 in a plurality of portions equally arranged in a circumferential direction of the metal substrate 3. Each retaining part 3a is a recessed part opened to an inner peripheral surface 3b of the metal substrate 3, and a cross-section (cross-section in a direction orthogonal to the axial direction) of the retaining part 3a is formed into a shape matched with the sectional shape of the lubricating member 4. The retaining part 3a in this embodiment has a partially cylindrical surface shape obtained by cutting off a partial circumferential region of a cylindrical surface and is formed into the same shape over the entire length in the axial direction of the metal substrate 3 so as to be opened to both axial end surfaces of the metal substrate 3.

The lubricating member 4 is formed into a shape (partially cylindrical shape) matched with the shape of the retaining part 3a of the metal substrate 3. The peripheral surface of the lubricating member 4 comprises an outer side surface 4a opposed to the retaining part 3a of the metal substrate 3 and an inner side surface 4b opposed to an outer peripheral surface of the shaft 2. The outer side surface 4a is formed into a protruding cylindrical surface shape that is brought into surface contact with the retaining part 3a of the metal substrate 3, and the inner side surface 4b is formed into a recessed cylindrical surface shape that continues without any step from the inner peripheral surface 3b of the metal substrate 3. The inner peripheral surface 3b of the metal substrate 3 and the inner side surface 4b of the lubricating member 4 form the bearing surface 11 having a true circle shape in cross-section as the sliding surface.

In the sintered bearing 1, the lubricating member 4 formed in a part of the bearing surface 11 serves as a supply source of graphite particles. The graphite particles supplied from the lubricating member 4 permeate to the entire bearing surface 11 due to the relative motion of the bearing surface 11 and the shaft 2, and hence a lubricating effect can be obtained on the entire bearing surface 11.

Further, in the sintered bearing 1, the shaft 2 does not always slide with the entire bearing surface 11, and a limited partial region of the bearing surface 11 slides with the shaft 2 in most cases. For example, when the shaft 2 is in a horizontal posture, the shaft 2 sinks due to the force of gravity to be brought into sliding contact with the bearing surface 11 in a lower side region of the bearing surface 11 in most cases. In this case, the shaft 2 can be allowed to slide always with the lubricating member 4 by designing the position and shape of the lubricating member 4 so that the lubricating member 4 is positioned in a sliding region with respect to the shaft 2 or by adjusting the phase in the circumferential direction of the sintered bearing 1 so that the lubricating member 4 is positioned in the sliding region. Therefore, a high lubricating effect can be obtained, and the shaft 2 can be supported even in an oil-less state in which lubricating oil is not present on the bearing surface 1. Thus, the sintered bearing 1 can be provided, which can withstand the use under a severe condition, such as high temperature, high contact pressure, or high-speed rotation.

In the case where the graphite particles are dispersed onto the bearing surface as in an existing sintered bearing, even when the blending ratio of the graphite powder with respect to the raw material powder is increased to increase the concentration of the graphite particles on the bearing surface in order to enhance the lubricity, the graphite particles that are blended excessively inhibit the binding between metal particles, and hence the strength of the sintered bearing is decreased. Thus, there is a limit to the enhancement of the lubricity. In contrast, when at least a part of the sliding surface is formed of the lubricating member 4 made of an aggregate of solid lubricant particles (graphite particles, etc.) as described above, the amount of the graphite particles to be supplied to the bearing surface 11 can be increased to enhance the lubricating effect merely by increasing the number of the lubricating members 4 or enlarging the lubricating member 4. Also in this case, the binding strength between the metal particles in the metal substrate 3 is not decreased, and hence a decrease in strength of the sintered bearing 1 can be avoided.

Meanwhile, when a part of the bearing surface 11 is formed of the lubricating member 4 made of an aggregate of graphite particles as described above, there is a problem regarding how to fix the lubricating member 4 onto the metal substrate 3. When press-fitting is adopted as fixing means, it is necessary to process fitting surfaces of both the lubricating member 4 and the metal substrate 3 with high accuracy by mechanical processing or the like in order to obtain an appropriate press-fitting margin, with the result that processing cost increases. Further, when bonding is adopted as fixing means, a bonding step is newly required, resulting in a decrease in productivity. In any case, the largest advantage of the sintered bearing 1, that is, the reduction in cost by near-net-shape molding is reduced.

In view of the above-mentioned problem, in the invention of the present application, a new configuration is adopted in which the lubricating member 4 is fixed onto the metal substrate 3 by the sintering operation at a time of sintering the raw material powder to form the metal substrate 3. This configuration relies on the new concept that the fixing force is ensured by a physical change or a chemical change of the metallic structure caused by the sintering operation.

As a first procedure for fixing the lubricating member 4 onto the metal substrate 3 by the sintering operation as described above, it is conceivable to utilize a contraction force F of the metal substrate 3 generated along with the sintering operation. Now, a manufacturing process of the sintered bearing 1 by this procedure is described as a first embodiment.

Figure 3:
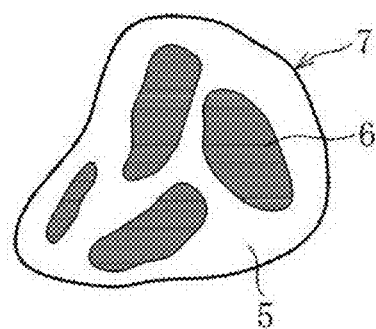
FIG. 3 is a sectional view for illustrating granulated powder.

The lubricating member 4 is formed by molding and firing raw material powder containing graphite powder serving as solid lubricant powder and a binder. In this case, when mixed powder containing simple substance powder of the binder and the graphite powder is used as the raw material powder, the flowability of the graphite powder is low, and hence it is difficult to mold the mixed powder into a predetermined shape when a large amount of the graphite powder is contained in the mixed powder. Therefore, it is preferred that granulated graphite powder 7 obtained by granulating a plurality of graphite powders 6 in the presence of a binder 5 as illustrated in FIG. 3 be used as the raw material powder.

As the graphite powder to be used in the granulated graphite powder 7, any of natural graphite powder and artificial graphite powder may be used. The natural graphite powder generally has a feature of having a scale-like shape and being excellent in lubricity. Meanwhile, the artificial graphite powder has a feature of having a lump shape and being excellent in moldability. Thus, when the lubricity is regarded as important, it is preferred that the granulated graphite powder using the natural graphite powder be used. When the moldability is regarded as important, it is preferred that the artificial graphite powder be used. As the binder, for example, a resin material, such as a phenol resin, may be used.

Figure 2A:
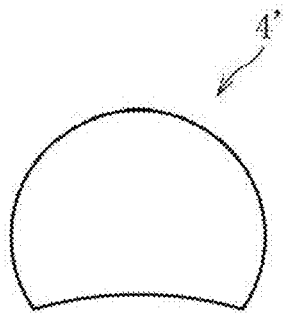
FIG. 2A is a front view of a fired body.
Figure 2B:
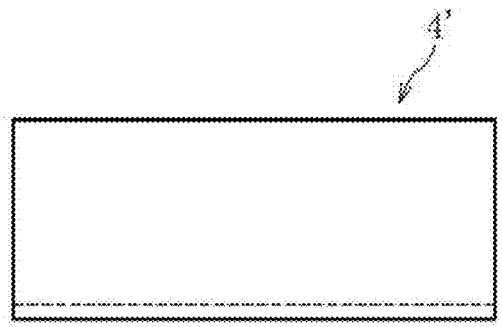
FIG. 2B is a side view of the fired body.

The granulated graphite powder 7 described above is uniformly mixed with a molding aid, a lubricant, a modifier, or the like as necessary. This mixture is supplied into a mold and subjected to pressure molding, to thereby form a molded body 4' (graphite powder molded body) conforming to the shape of the lubricating member 4 as illustrated in FIG. 2A and FIG. 2B. After that, the graphite powder molded body 4' is fired at a furnace temperature of, for example, from 900° C. to 1,000° C. to provide a porous fired body (lubricating member 4). The firing is performed in an atmosphere free of oxygen, for example, an atmosphere of inert gas, such as nitrogen gas, or a vacuum atmosphere. This is because, when oxygen, is present in the atmosphere, the graphite powder volatilizes as CO or $CO_2$ during firing to dissipate.

Figure 4:
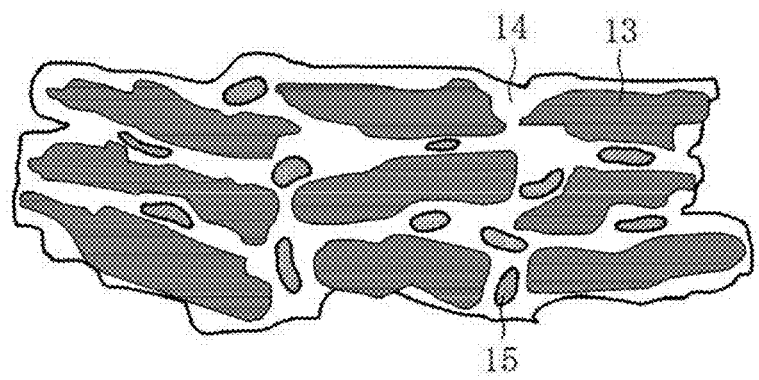
FIG. 4 is a sectional view of a fired lubricating member.

FIG. 4 is a schematic view of a micros true tare of the fired lubricating member 4. The resin binder contained in the granulated graphite powder is formed into a carbonization product (amorphous carbon) due to firing, to thereby form a binder component 14 having a network structure. Graphite particles 13 serving as solid lubricant particles derived from the graphite powder are retained in the network of the binder component 14. The graphite particles 13 are retained in the network when the surface of the binder component 14 intertwines with the surfaces of the graphite particles 13. In FIG. 4, a large number of pores formed in the microstructure are denoted by reference numeral 15. On the surface of the lubricating member 4, the graphite particles 13 occupy an area ratio of 60% or more, preferably 80% or more, and hence high lubricity is obtained during sliding with the shaft 2.

Meanwhile, the metal substrate 3 is manufactured by a general manufacturing process adopted in a sintered bearing, that is, by subjecting raw material powder containing metal powder as a main component to compression molding with a mold and heating and sintering the molded body (metal powder molded body). As the metal substrate 3, any kinds of sintered metals, such as a copper-based metal containing copper as a main component, an iron-based metal containing iron as a main component, and a copper-iron based metal containing copper and iron as main components, may be used. Besides those metals, a special sintered metal, such as an aluminum-bronze based metal, may also be used.

For example, in a copper-iron based sintered bearing, a mixture of iron powder, copper powder, and low-melting-point metal powder is used as the raw material powder. The low-melting-point metal is a component that is melted itself during sintering to cause liquid, phase sintering to proceed, and a metal having a melting point lower than that of copper is used. Specifically, a metal having a melting point of 700° C. or less, for example, tin (Sn), zinc (Zn), phosphorus (P), or the like may be used. Of those, Sn having satisfactory compatibility with copper is preferably used. The low-melting-point metal may be added to the mixed powder not only by adding simple substance powder thereof to the mixed powder but also by alloying the simple substance powder with other metal powders.

Besides the above-mentioned metal powder, a sintering aid, for example, calcium fluoride and a lubricant, for example, zinc stearate may be added to the raw material powder as necessary, and further, graphite powder may also be added to the raw material as solid lubricant powder. Through addition of the graphite powder, the graphite particles can be dispersed into a sintered structure of the metal substrate 3 after sintering, and hence the lubricity of a portion of the bearing surface 11 formed of the metal substrate 3 can be further enhanced.

Figure 5:
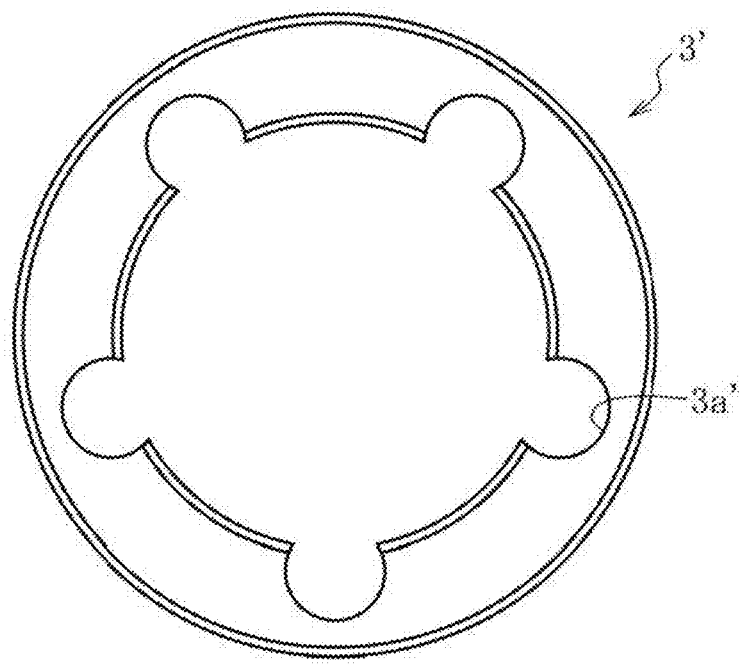
FIG. 5 is a front view of a metal substrate.

In a molding step, the raw material powder is filled into the mold, followed by being compressed, to thereby form a molded body 3' (metal powder molded body) having a shape conforming to that of the metal substrate 3 as illustrated in FIG. 5. In the metal powder molded body 3', recessed parts 3a' corresponding to the retaining parts 3a of the metal substrate 3 are formed during the molding.

Then, the fired body (lubricating member 4) manufactured by the above-mentioned procedure is fitted into each recessed part 3a' of the metal powder molded body 3' through gap fit. Then, an assembly of the metal powder melded body 3' and the lubricating member 4 is heated at a sintering temperature required for sintering the metal powder molded body 3' (for example, from about 750° C. to about 900° C. when the metal powder molded body 3' is made of a copper-iron based metal), to thereby sinter the metal powder molded body 3'. During sintering, the fired lubricating member 4 is also heated. However, the structure of the lubricating member 4 does not change during heating, and the structure and form of the lubricating member 4 are maintained before and after firing.

Figure 15A:
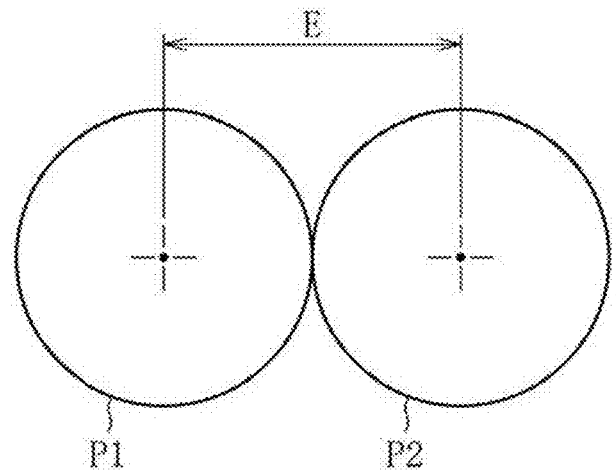
FIG. 15A is a model view for illustrating metal powder before sintering.
Figure 15B:
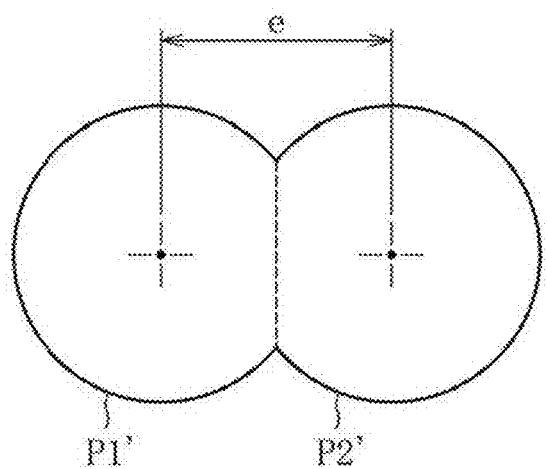
FIG. 15B is a model view for illustrating metal powder after sintering.

In a stage of the metal powder molded body before sintering, metal powders P1 and P2 are held in contact with each other (interparticle distance in this case is represented by E) as illustrated in FIG. 15A. Meanwhile, when the metal powder molded body is sintered, a part of the structure of adjacent metal powders P1' and P2' diffuses to a counterpart side as illustrated in FIG. 15B, and hence an interparticle distance e after sintering is smaller than the interparticle distance E before sintering (E>e). The interparticle distance is reduced along with sintering as described above. Therefore, the contraction force F (see FIG. 1A) in a direction in which both a radially inner surface and a radially outer surface are reduced in diameter is generated in the metal substrate 3 after sintering, and the fitting between the metal substrate 3 and the lubricating member 4 is shifted from the gap fit state to an interference fit state due to the contraction force F. Thus, the lubricating member 4 can be reliably fixed onto the metal substrate 3, and hence the lubricating member 4 during use can be prevented from dropping out. In particular, as illustrated in FIG. 1A, when an opening width D0 of the retaining part 3a in the metal substrate 3 is set to be smaller than a maximum width D (diameter dimension) of the lubricating member 4, the dropout of the lubricating member 4 to a radially inner side can be more reliably regulated.

The contraction of the metal powder molded body 3' during sintering can be reinforced through use of, for example, particles having irregular shapes as particles forming the metal powder. In this case, the particles having irregular shapes are spheroidized along with sintering, and the interparticle distance is reduced. Therefore, the contraction of the molded body 3' becomes even more remarkable. As iron powder and copper powder, there are typically given reduced powder, atomized powder, electrolytic powder, and the like. However, when reduced iron powder having a porous sponge-like shape is used as iron powder, and electrolytic copper powder having a dendritic shape is used as copper powder, both the powders have high irregularity, and hence the high contraction force F can be obtained. Thus, when the contraction force F is intended to be increased, it is preferred that the reduced iron powder or the electrolytic copper powder be used as the iron powder or the copper powder in the raw material powder. The magnitude of the contraction force F generated during sintering can be adjusted by adding iron powder of a kind other than the reduced iron powder to the reduced iron powder or adding copper powder of a kind other than the electrolytic copper powder to the electrolytic copper powder.

The sintered product having passed through the sintering step is transferred to a sizing step, and the dimensions of each part of the surface (inner peripheral surface, outer peripheral surface, and both end surfaces) is corrected by re-compression in a mold. In this case, when at least the inner peripheral surface serving as the bearing surface 11 is subjected to sizing, the bearing surface 11 having high circularity can be obtained, and stable bearing performance can be obtained. The bearing surface 11 is finally finished by siring as just described, and hence a step may be present between the inner peripheral, surface 3b of the metal substrate 3 and the inner side surface 4b of the lubricating member 4 at the end of sintering. When a step that cannot be corrected by sizing is present, sizing is performed after the entire inner peripheral surface of the sintered product, that is, the entire inner peripheral surface 3b of the metal substrate 3 and the entire inner side surface 4b of the lubricating member 4 are subjected to mechanical processing, such as cutting.

Through the sizing step, the sintered bearing 1 as illustrated in FIG. 1A and FIG. 1B is completed. The sintered bearing 1 is used as a dry bearing that is not basically impregnated with lubricating oil, liquid grease, or the like. As necessary, oil impregnation treatment of impregnating the lubricating oil, liquid grease, or the like into the sintered bearing 1 may be performed after sizing so that the lubricating oil component is retained in pores of any one or both of the metal substrate 3 and the lubricating member 4.

As a second procedure for fixing the lubricating member 4 onto the metal substrate 3 by the sintering operation, it is conceivable to form the lubricating member 4 with a material that can be sintered. Now, the configuration and manufacturing process of the sintered bearing 1 by this procedure are described as a second embodiment.

Figure 6:
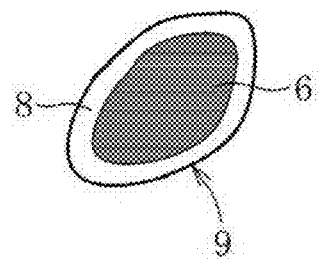
FIG. 6 is a sectional view of plated powder.

In the second embodiment, the lubricating member 4 is formed by sintering the molded body obtained by molding the raw material powder. In this case, the raw material powder contains, as a main component, coated powder in which solid lubricant powder is coated with a metal. As the coated powder, for example, plated powder 9 in which solid lubricant powder 6 is plated with a metal 8 (non-electrolytic plating) as illustrated in FIG. 6 may be used (in the following description, the metal 8 is referred to as "coating metal"). It is preferred that graphite powder be used as the solid lubricant powder 6, and copper (Cu) or nickel (M) be used as the coating metal 8. As the plated powder 9, the graphite powder 6 having its entire surface coated with the coating metal 8 is most preferred. However, it is not necessarily required that the entire surface be coated, and a part of the surface of the graphite powder 6 may be exposed to outside of the simple substance plated powder 9. The ratio of the coating metal 8 in the plated powder 9 is about 10 wt % or more and about 80 wt % or less, preferably about 15 wt % or more and about 60 wt % or less, more preferably about 20 wt % or more and about 50 wt % or less. When the amount of the coating metal 8 is too small, the ratio of the graphite powder 6 exposed to the surface of the plated powder 9 increases, and the binding strength between particles after sintering becomes insufficient. Meanwhile, when the amount of the coating metal 8 is too large, the amount of graphite exposed to the inner side surface 4b of the lubricating member 4 serving as the bearing surface 11 decreases, and the lubricity of the lubricating member 4 is degraded. The specific gravity of copper and that of nickel are substantially the same. Therefore, irrespective of whether copper or nickel is used as the coating metal 8, there is no substantial difference in preferred weight ratio.

As the graphite powder 6 to be used in the plated powder 9, artificial graphite powder is preferably used. This is because, when natural graphite powder having a scale-like shape is used, it is difficult to sufficiently coat the graphite powder 6 with the coating metal 8. When the coating of the graphite powder 6 with the coating metal 8 is insufficient, the coating metals 8 of the plated powder cannot be bound to each other in a later sintering step, and hence the strength cannot be ensured.

In order to strongly bind the coating metals 8 of the plated powder 9 to each other, a low-melting-point metal is incorporated into the raw material powder. As a procedure for incorporating the low-melting-point metal into the raw material powder, it is conceivable to add simple substance powder of the low-melting-point metal to the plated powder 9 or precipitating the coating metal 8 alloyed with the low-melting-point metal on the periphery of the graphite powder 6 during plating. As the low-melting-point metal, a metal having a melting point of 700° C. or less, for example, tin (Sn), sine (Zn), phosphorus (P), or the like may be used in the same manner as in the first embodiment, and of those, Sn is preferably used.

In this case, the ratio of the low-melting-point metal with respect to the coating metal 8 is set to a range of from 0.3 wt % to 5 wt %, preferably from 0.5 wt % to 3 wt %. When the ratio of the low-melting-point metal is too small, the liquid phase sintering does not proceed, and hence the required strength cannot be obtained. Meanwhile, when the ratio of the low-melting-point metal is too large, the amount of graphite exposed to the inner side surface 4b of the lubricating member 4 serving as the bearing surface 11 decreases, and the inner side surface 4b is unnecessarily hardened to degrade the lubricity of the lubricating member 4. Therefore, the above-mentioned ratio is adopted.

A sintering aid and a lubricant are added as necessary to the raw material powder forming the lubricating member 4 in addition to the above-mentioned powders (plated powder and low-melting-point metal powder as necessary).

In the second embodiment, raw material powder for forming the metal substrate 3 is common to the raw material powder forming the metal substrate 3 according to the first embodiment, and hence overlapping description of the same part is omitted. How, the manufacturing process of the sintered hearing 1 is described with use of first powder Ma as the raw material powder (containing the plated powder 9) of the lubricating member 4 and second powder Mb as the raw material powder of the metal substrate 3.

In a molding step of this embodiment, there is adopted a so-called two-color molding (multicolor molding) procedure involving supplying the first powder Ma and the second powder Mb into the same mold and simultaneously molding the first powder Ma and the second powder Mb. In the two-color molding, two cavities are defined in the mold, and powder is filled into each cavity and molded.

Figure 7:
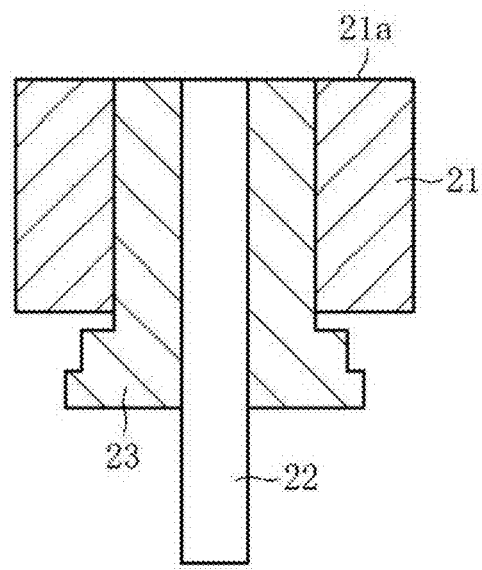
FIG. 7 is a sectional view for illustrating a compression molding step.

FIG. 7 is an example of a mold for two-color molding. The mold comprises a die 21, a core pin 22 arranged on an inner periphery of the die 21, a lower punch 23 arranged between an inner peripheral surface of the die 21 and an outer peripheral surface of the core pin 22, a partition member 25 (see FIG. 8), a guide 28 having a conical surface shape (see FIG. 8), and an upper punch 29 (see FIG. 12). The guide 28 is arranged so as to facilitate the filling of the first powder Ma into the cavity, and the guide 28 may be omitted as long as such filling is performed smoothly.

Figure 8:
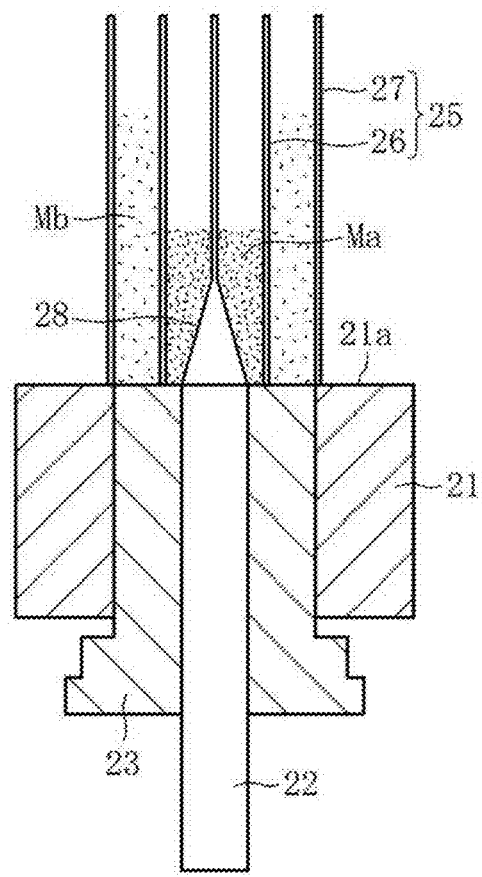
FIG. 8 is a sectional view for illustrating the compression molding step.

As illustrated in FIG. 8, the partition member 25 comprises an inside partition 26 and an outside partition 27 that are arranged concentrically. The partitions 26 and 27 are formed so as to be raised and lowered independently. The inside partition 26 is formed into a shape conforming to that of each lubricating member 4 illustrated in FIG. 1.

In the compression molding step, first, as illustrated in FIG. 7, under a state in which the partition member 25 and the guide 28 are retreated from the mold, the core pin 22 and the lower punch 23 are raised, and upper end surfaces of the core pin 22 and the lower punch 23 are arranged at the same level as that of an upper end surf ace 21a of the die 21. The retreat direction of the partition member 25 and the guide 28 from the mold may be an upper direction or a side direction.

Then, as illustrated in FIG. 8, the partition member 25 and the guide 28 are arranged on the mold, and a lower end surface of the inside partition 26 is brought into contact with the upper end surface of the lower punch 23, to thereby bring a lower end surface of the outside partition 27 into contact with the upper end surface 21a of the die 21. Further, a lower end surface of the guide 28 is brought into contact with the upper end surface of the core pin 22. Under this state, a space between the inside partition 26 and the guide 28 is filled with the first powder Ma, and a space between the inside partition 26 and the outside partition 27 is filled with the second powder Mb.

Figure 9:
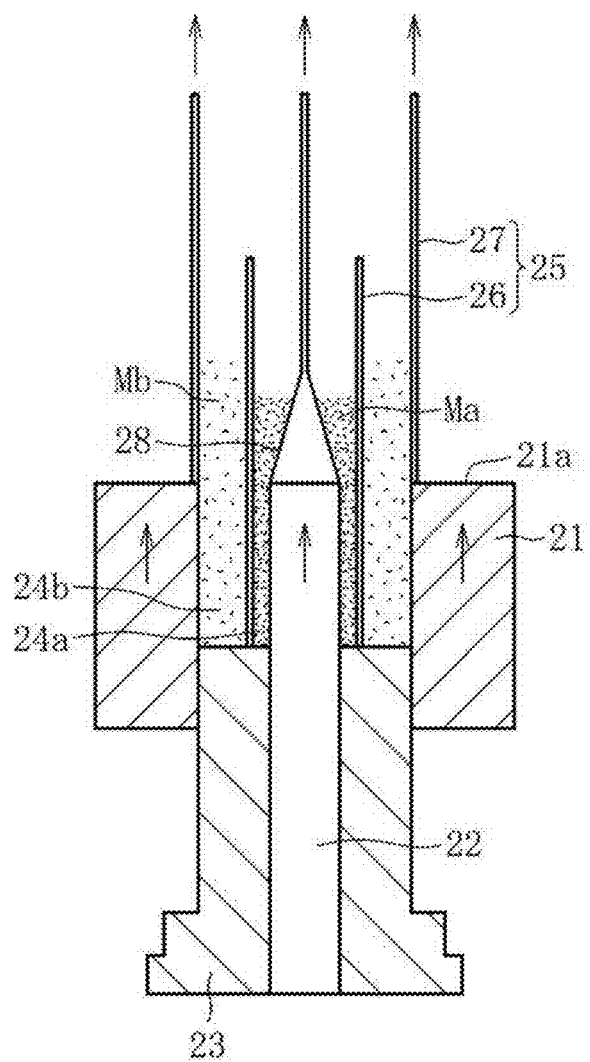
FIG. 9 is a sectional view for illustrating the compression molding step.

Then, as illustrated in FIG. 9, while the positions of the lower punch 23 and the inside partition 26 are held, the die 21, the core pin 22, and the outside partition 27 are raised in tandem with each other. Thus, an inside cavity 24a between the inside partition 26 and the core pin 22 is filled with the first powder Ma, and an outside cavity 24b between the inside partition 26 and the die 21 is filled with the second powder Mb.

Figure 10:
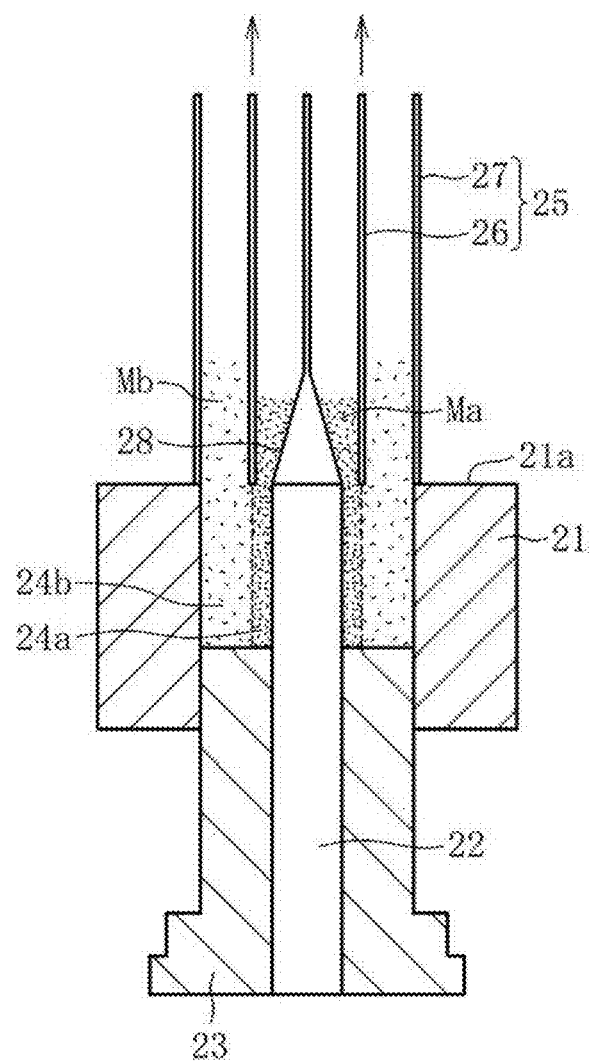
FIG. 10 is a sectional view for illustrating the compression molding step.

Next, as illustrated in FIG. 10, the inside partition 26 is raised. As a result, the inside partition 26 that defines the inside cavity 24a and the outside cavity 24b is removed, and both the cavities 24a and 24b are integrated. Even when the inside partition 26 is removed as just described, the first powder Ma and the second powder Mb are not completely mixed with each other, and both the powders Ma and Mb are kept in a separated state (broken line of FIG. 10 is a line for representing the boundary between the powder Ma and the powder Mb for convenience).

Figure 11:
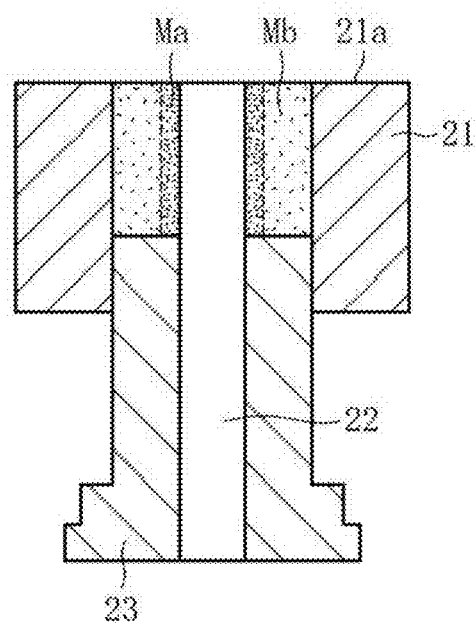
FIG. 11 is a sectional view for illustrating the compression molding step.
Figure 12:
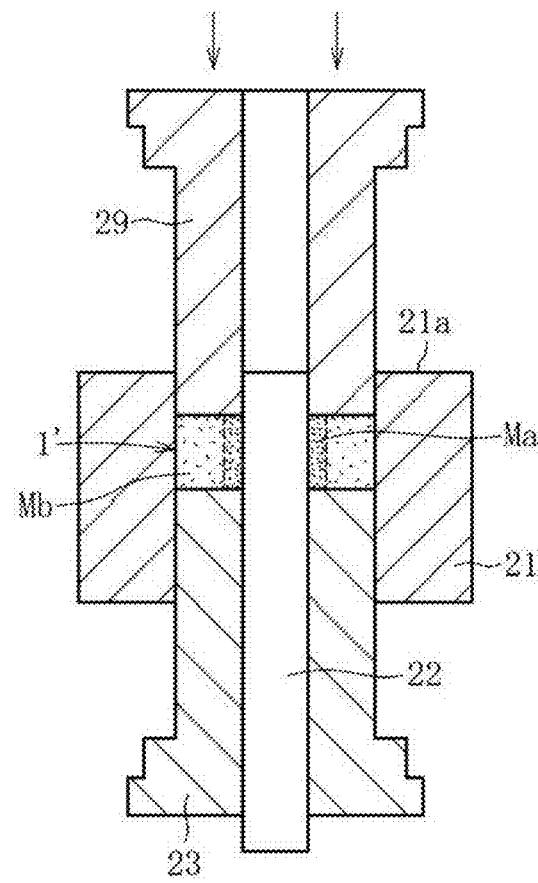
FIG. 12 is a sectional view for illustrating the compression molding step.

Next, as illustrated in FIG. 11, the partition member 25 and the guide 26 are removed, and further, surplus powder having flown out of the cavities 24a and 24b is removed. Then, as illustrated in FIG. 12, the upper punch 29 is lowered to compress the first powder Ma and the second powder Mb in the cavities, to thereby produce a molded body 1'.

Figure 13:
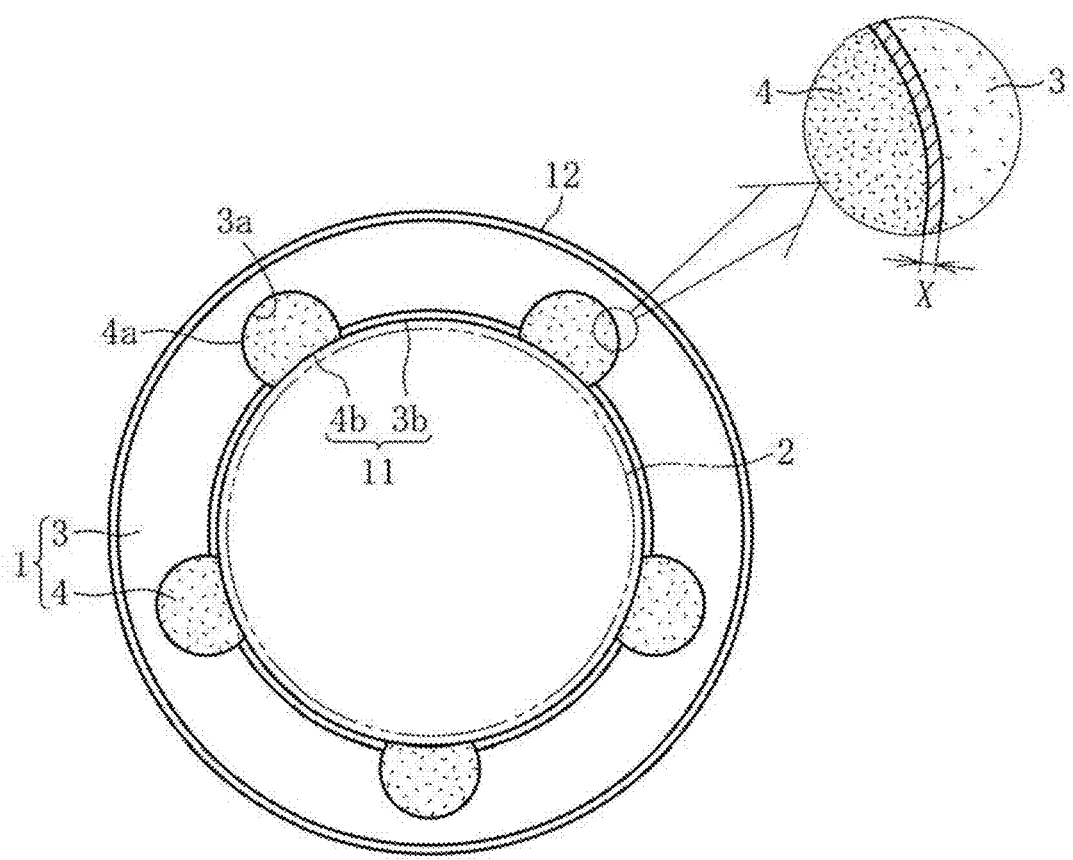
FIG. 13 is a front view and main part enlarged view of a sintered bearing according to a second embodiment of the first invention of the present application.

After that, the molded body 1' is taken out from the mold and sintered at a temperature (for example, from about 750° C. to about 900° C.) that is higher than the melting point of the low-melting-point metal and is lower than the melting point of the coating metal 8 (copper or nickel) of the plated powder 9, to thereby complete the sintered bearing 1 illustrated in FIG. 13. In this case, the lubricating member 4 is formed by sintering the first powder Ma, and the metal substrate 3 is formed by sintering the second powder Mb.

During the sintering, the low-melting-point metal contained in the first powder Ma on the inner side is melted, and the molten low-melting-point metal wets the coating metal 8 (for example, copper) of the plated powder 9 to form an alloy with the coating metal 8. Due to this alloying, the surface of the coating metal 8 is melted at a temperature lower than the melting point thereof, and the melt binds the coating metals 8 of the plated powder 9 to each other, with the result that the first powder Ma is formed into a sintered body.

The alloy melt of the coating metal 8 and the low-melting-point metal permeates the molded body made of the second powder Mb and diffuses to the metal powder contained in the second powder Mb, to thereby bind the metal powders (for example, iron powders, copper powders, or iron powder and copper powder) to each other. When the second powder Mb contains the low-melting-point metal, copper, and the like, the metal powders contained in the second powder Mb are bound to each other due to the same action. Further, even when the second powder Mb is made of iron-based powder and does not contain the low-melting-point metal or copper, the alloy melt generated in the first powder Ma diffuses to the iron powder of the second powder Mb to bind the iron powders to each other. Due to the above-mentioned action, the entire molded body 1' is formed into a sintered body, and hence the sintered bearing 1 having high strength is obtained. Further, the boundary portion between the metal substrate 3 and the lubricating member 4 is formed into a sintered structure without an interface, and hence the lubricating member 4 can be more reliably fixed onto the metal substrate 3.

Meanwhile, the graphite powder 6 contained in the plated powder 9 of the first powder Ma basically remains without moving to the second powder Mb side, and hence the lubricating member 4 is formed into a structure rich in graphite particles.

After that, in the same manner as in the first embodiment, at least the bearing surface 11 is subjected to sizing, and further, oil impregnation is performed as necessary. Thus, the sintered bearing 1 as illustrated in FIG. 1B and FIG. 13 is completed.

Substantially the entire surface of the plated powder 9 is coated with the coating metal 8. Therefore, immediately after the sintering step, most of the inner side surface 4b of the lubricating member 4 is coated with metal particles derived from the coating metal 8. When the metal particles of the inner side surface 4b of the lubricating member 4 are peeled or dropped out due to sliding with a sizing die (for example, a core rod) in a later sizing step of the bearing surface 11, a large amount of the graphite particles can be exposed to the inner side surface 4b, and the distribution amount (area ratio) of the graphite particles on the inner side surface 4b can be increased to the same degree as that of the first embodiment. In order to effectively perform peeling or dropout of the metal particles, when the bearing surface 11 is subjected to sizing, it is preferred to perform an operation involving squeezing the inner peripheral surface of the sintered product with the sizing die, for example, an operation involving press-fitting the sintered product into the die to press the inner peripheral surface of the sintered product onto the sizing die, and under this state, sliding the sizing die in the axial direction.

Even in the case where the amount of the graphite particles exposed to the inner side surface 4b of the lubricating member 4 is insufficient in an initial state, when the shaft 2 (see FIG. 1B) is rotated later, the metal particles with which the inner side surface 4b is coated are peeled and dropped out due to the sliding with the shaft 2, and a necessary and sufficient amount of graphite particles appears on the inner side surface 4b.

In the sintered bearing 1 according to the second embodiment, when the inside partition 26 is removed, the first powder Ma and the second powder Mb cannot be prevented from being mixed with each other in the vicinity of the boundary therebetween. Therefore, a clear interface is not present between the metal substrate 3 and the lubricating member 4, and a transition layer X having a concentration gradient of each element is formed therebetween from the metal substrate 3 side to the lubricating member 4 side as illustrated in an enlarged view of FIG. 13.

As a third embodiment, the sintered bearing 1 may also be manufactured by a combination of the first embodiment and the second embodiment. The manufacturing procedure of the sintered bearing 1 in the third embodiment is as follows. Specifically, raw material powder containing the plated powder 9 as a main component is molded and sintered to form the lubricating member 4 by the same procedure as that of the second embodiment. Next, the lubricating member 4 is fitted into the recessed parts 3a' of the metal powder molded body 3' (see FIG. 5) described in the first embodiment, and under this state, an assembly formed of the metal powder molded body 3' and the lubricating member 4 is heated at a sintering temperature to sinter the metal powder molded body 3'. During this sintering, the lubricating member 4 is fixed onto the metal substrate 3 with the contraction force F generated in the metal powder molded body 3'. After that, at least the bearing surface 11 is subjected to sizing. Thus, the sintered bearing as illustrated in FIG. 1A and FIG. 1B can be obtained.

In the above-mentioned description, the bearing is exemplified as an example of the sliding member, but the sliding member of the present invention can be widely used as a member configured to support a mating member that performs relative motion. The relative motion as used herein is not limited to rotation motion and also includes linear motion. Further, as the form of the mating member, any form, such as a flat shape, may be adopted in addition to the shaft shape. Further, the sliding member also has any form and is not limited to the cylindrical shape as in the sintered bearing 1. A form such as a flat shape called a sliding pad may also be adopted.

Figure 14A:
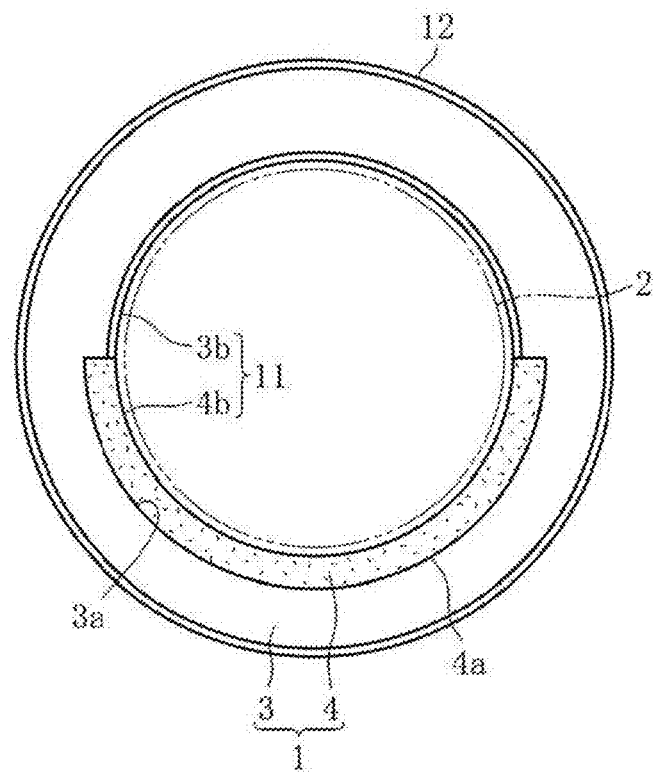
FIG. 14A is a front view for illustrating a sintered bearing according to another embodiment.
Figure 14B:
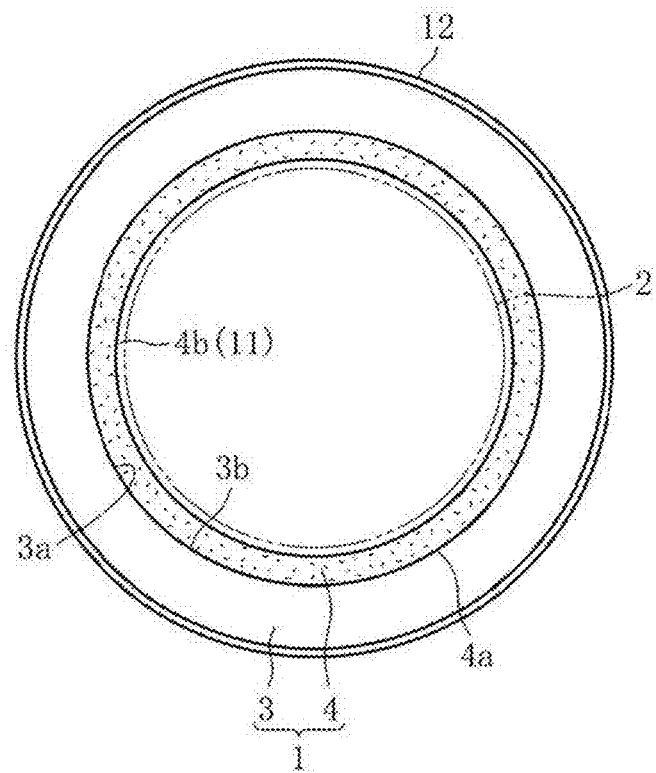
FIG. 14B is a front view for illustrating a sintered bearing according to another embodiment.

Further, in the above-mentioned description, there is illustrated the case where the plurality of lubricating members 4 are arranged in the circumferential direction of the metal substrate 3, but the configuration of the lubricating member 4 is not limited thereto. For example, the lubricating member 4 that continues in the circumferential direction may be arranged so as to cover a substantially half periphery of the bearing surface 11 as illustrated in FIG. 14A or may also be arranged so as to cover substantially the entire periphery of the bearing surface 11 as illustrated in FIG. 14B.

Further, the lubricating members 4 may also be arranged in a spiral manner with an axial center being the center, instead of being arranged along the axial direction as illustrated in FIG. 1A and FIG. 1B. With this, each part of the shaft 2 in the axial direction is allowed to pass by the lubricating member 4 at least once during one rotation, and hence satisfactory lubricity is obtained. Further, the lubricating members 4 may also be arranged in a limited partial region in the axial direction, instead of being arranged over the entire length of the metal substrate 3 in the axial direction as illustrated in FIG. 1A and FIG. 1B. In any case, the effect of the invention of the present application can be attained as long as at least a part of the bearing surface 11 is formed of the lubricating member 4.

Besides the foregoing, a part of a mounting surface (for example, the outer peripheral surface 12 of the metal substrate 3) of the sliding member with respect to another member may also be formed of the lubricating member 4 by extending the lubricating member 4 in a radial direction.

Further, in the above-mentioned description, there is illustrated the case where graphite is used as the solid lubricant forming the lubricating member 4. However, a solid lubricant other than graphite, for example, molybdenum disulfide may also be widely used.

There is no particular limitation on the application of the sliding member described above, but the sliding member is particularly suitable for use under a severe condition, such as high temperature, high contact pressure, or high-speed rotation. For example, the sliding member can be used in a bearing for a fuel pump in an automobile engine, a bearing for an exhaust gas recirculation (EGR) valve of an EGR device to be installed for the purpose of reducing nitrogen oxide (NOx) in exhaust gas, and the like. In those applications, corrosion resistance of the bearing with respect to gasoline and exhaust gas is also required, and hence it is preferred that an aluminum-bronze based substrate excellent in corrosion resistance be used as the metal substrate 3. Besides the foregoing, the sliding member can also be used as, for example, a bearing to be used in a joint portion of an arm in a construction machine (bulldozer, hydraulic shovel, etc.)

Further, the sliding member described above can also be used as a driven element (gear, pulley, etc.) to be supported in a rotatable manner by a fixing shaft in a torque transmission mechanism. Depending on the application to the driven element, it is not preferred, in some cases, that lubricating oil be interposed in a sliding part between the driven element and the fixing shaft, and the sliding member of the present invention is suitable for such application. For example, a gear pump for fueling is arranged in a weighing machine to be installed in a gas station or the like, and a driven gear may be arranged in a fueling path of the gear pump for fueling. In this case, in order to avoid the mixing of lubricating oil into fuel, kerosene, or the like, it is not preferred that lubricating oil be impregnated into the driven, gear. Thus, it is preferred that the sliding member of the present invention, which enables high lubricity to be obtained even without using lubricating oil, be used as the driven gear to be used for such application.

Figure 16:
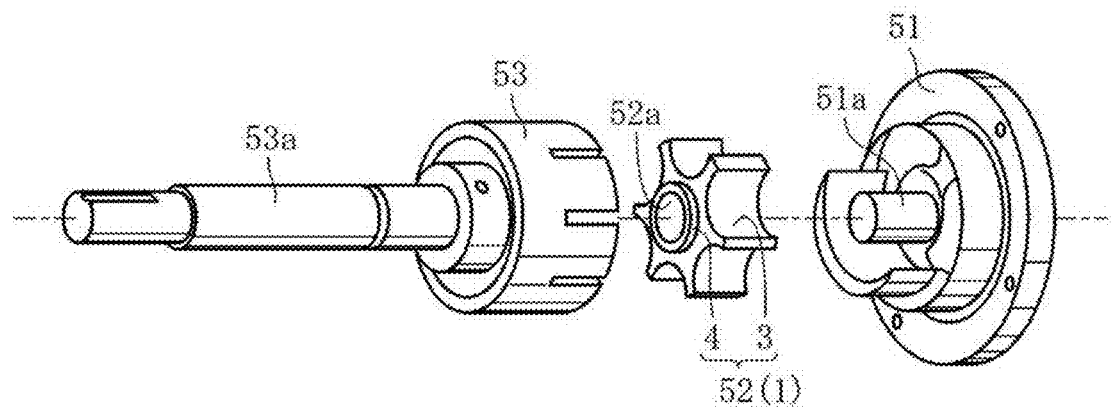
FIG. 16 is an exploded perspective view of an internal gear pump.
Figure 17:
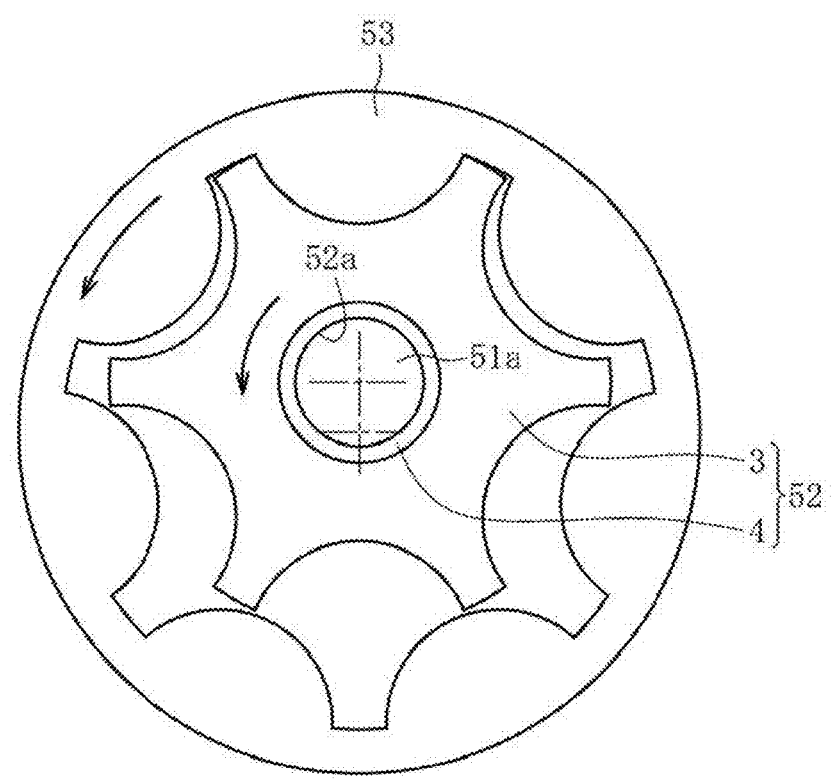
FIG. 17 is a sectional view for illustrating a fitted portion between an outer rotor and an inner rotor.

FIG. 16 is an exploded perspective view of an internal gear pump to be used as the above-mentioned gear pump for fueling. As illustrated in FIG. 16, the gear pump comprises a main body 51 serving as a stationary side, an external tooth-type inner rotor 52 (driven gear), and an internal tooth-type outer rotor 53. The outer rotor 53 comprises a drive shaft 53a that is driven by a rotation drive source, such as a motor. The main body 51 comprises a fixing shaft 51a eccentric with respect to the drive shaft 53a, and a shaft bole 52a of the inner rotor 32 is fitted in a rotatable manner onto an outer periphery of the fixing shaft 51a. As illustrated in FIG. 17, the inner rotor 52 is arranged so as to be eccentric toward a radially inner side of the outer rotor 53 in a state in which external teeth of the inner rotor 52 are engaged with internal teeth of the outer rotor 53. The number of the teeth of the outer rotor 53 is set to be larger by one or two or more than the number of the teeth of the inner rotor 52.

When the outer rotor 53 is rotationally driven in such configuration, the inner rotor 52 also receives a rotation force due to the engagement of the tooth parts and is rotated in the same direction following the outer rotor 53. With this, the volume of a space between the tooth parts is enlarged and reduced, and hence gasoline or the like can be sucked in and discharged.

In the gear pump for fueling, the inner rotor 52 serving as the driven gear comprises the metal substrate 3 and the lubricating member 4 fixed onto the inner peripheral surface of the metal substrate 3 in the same manner as in the sintered bearing 1 described above. The metal substrate 3 is obtained by sintering raw material powder containing metal powder as a main component and forms a gear shape including a plurality of tooth parts on an outer periphery and a hole on an inner periphery. The lubricating member 4 is made of an aggregate of graphite particles and is fixed onto the inner peripheral surface of the metal substrate 3 by the sintering operation of sintering the raw material powder of the metal substrate 3. The inner peripheral surface of the lubricating member 4 forms a sliding surface (shaft hole 52a) that slides with the outer peripheral surface of the fixing shaft 51a. Each configuration of the metal substrate 3 and the lubricating member 4 and a fixing procedure thereof are common to those of the first to third embodiments of the sintered bearing 1. The metal Substrate 3 is also required, to have corrosion resistance to gasoline, and hence it is preferred that an aluminum-bronze based substrate excellent in corrosion resistance be used as the metal substrate 3.

When the inner peripheral surface of the lubricating member 4 is subjected to finishing processing, such as sizing and cutting, as necessary after the lubricating member 4 is fixed onto the metal substrate 3, the inner rotor 52 illustrated in FIG. 16 is completed. Lubricating oil is not impregnated into the metal substrate 3 or the lubricating member 4.

The inner rotor 52 having such configuration does not contain lubricating oil, and hence the mixing of lubricating oil into fuel and kerosene supplied by a weighing machine can toe avoided. Meanwhile, the sliding surface has high lubricity, and hence the torque loss in the inner rotor 52 can be minimized.

Next, a bearing is given as an example of a sliding member according to a second invention of the present application, and the details thereof are described, with reference to FIG. 18 to FIG. 27.

Figure 18A:
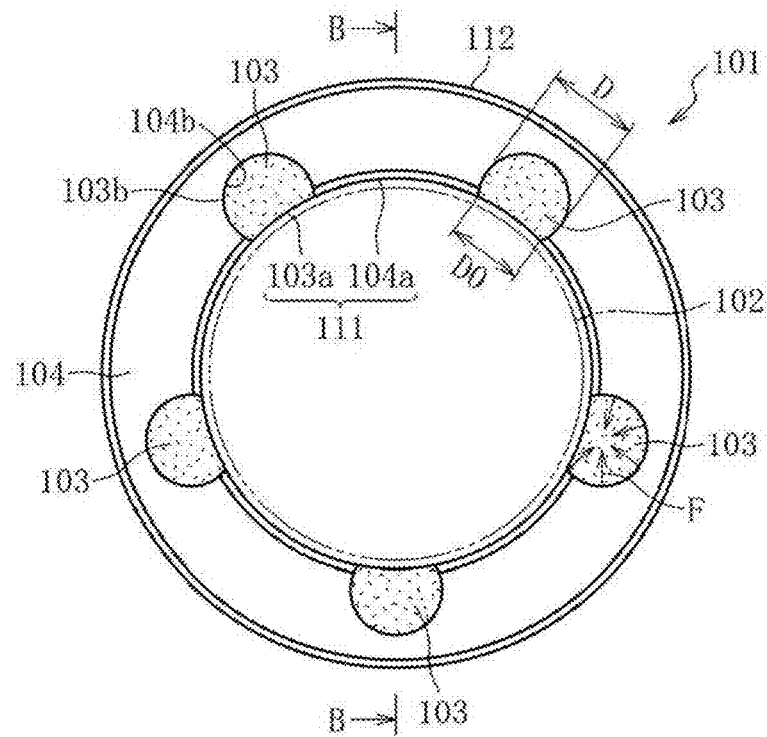
FIG. 18A is a front view of a sliding member (bearing) according to one embodiment of a second invention of the present application.
Figure 18B:
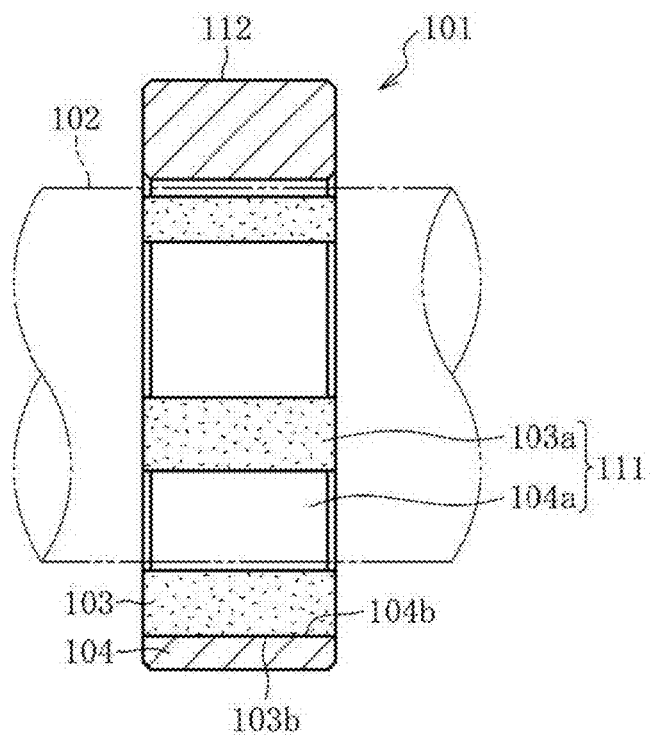
FIG. 18B is a sectional view taken along the line B-B of the sliding member of FIG. 18A.

As illustrated in FIG. 18A and FIG. 18B, a bearing 101 has a cylindrical shape, and a shaft 102 (represented by the chain line) is inserted as a mating member into an inner periphery of the bearing 101. A bearing surface 111 serving as a sliding surface that slides with she shaft 102 is formed on an inner peripheral surface of the bearing 101. In this embodiment, an outer peripheral surface 112 of the bearing 101 is fixed onto an inner peripheral surface of a housing (not shown) by means of, for example, press-fitting or bonding, and the shaft 102 inserted into the inner periphery of the bearing 101 is supported in a rotatable manner. The shaft 102 may also be set to a stationary side instead of being set to a rotation side as just described, and the bearing 101 may be set to the rotation side.

The bearing 101 comprises carbon-based fired bodies 103 containing carbon as a main component (component having the largest weight ratio) and a resin substrate 104 configured to retain the carbon-based fired bodies 103. In this embodiment, a plurality of (five in the illustrated example) carbon-based fired bodies 103 are arranged at equal intervals in the circumferential, direction, and the plurality of carbon-based fired bodies 103 are collectively retained by the resin substrate 104. Each carbon-based fired body 103 is exposed to the inner peripheral surface of the bearing 101 to forma part of the bearing surface 111. In the illustrated example, each carbon-based fired body 103 comprises an inner side surface 103a exposed to the inner peripheral surface of the bearing 101 and an outer side surface 103b that is held in close contact with the resin substrate 104. The inner side surface 103a of each carbon-based fired body 103 is formed into a recessed cylindrical surface shape that continues without any step from an inner peripheral surface 104a of the resin substrate 104. In this embodiment, the inner aide surface 103a of each carbon-based fired body 103 and the inner peripheral surface 104a of the resin substrate 104 form the bearing surface 111 having a true circle shape in cross-section. The outer side surface 103b of each carbon-based fired body 103 is formed into a protruding cylindrical surface shape and is held in close contact with the entire region of a retaining surface 104b having a recessed cylindrical surface shape of the resin substrate 104.

In the bearing 101, the carbon-based fired body 103 forming a part of the bearing surface 111 serves as a supply source of graphite particles. The graphite particles supplied from the carbon-based fired body 103 permeate to the entire bearing surface 111 due to the relative motion between the bearing surface 111 and the shaft 102, and hence the lubricating effect of the graphite particles can be obtained on the entire bearing surface 111.

Further, in the bearing 101, the shaft 102 does not always slide with the entire bearing surface 111, and a limited partial region of the bearing surface 111 slides with the shaft 102 in most cases. For example, when the shaft 102 is in a horizontal posture, the shaft 102 sinks due to the force of gravity to slide with the bearing surface 111 in a lower side region of the bearing surface 111 in most cases. In this case, the shaft 102 can be allowed to slide always with the carbon-based fired body 103 by designing the position and shape of the carbon-based fired body 103 in the bearing 101 or by adjusting the phase in the circumferential direction of the bearing 101 so that the carbon-based fired body 103 is positioned in a sliding region with respect to the shaft 102. With this, a high lubricating effect can be obtained, and hence the shaft 102 can be supported, for example, even in an oil-less state in which lubricating oil is not interposed between the bearing surface 111 and the shaft 102. Needless to say, the bearing 101 may also be used in a state in which lubricating oil is interposed between the bearing surface 111 and the shaft 102, and in this case, the lubricating effect is further enhanced. In this embodiment, lubricating oil is interposed between the bearing surface 111 and the shaft 102, and oil is impregnated into inner pores of the cartoon-based fired body 103. In this case, oil seeps out from the surface (inner side surface 103a) of the carbon-based fired body 103 due to an increase in temperature in association with the rotation of the shaft 102, and the oil is supplied to the sliding region between the bearing surface 111 and the shaft 102, with the result that the loss of an oil film in the sliding region is reliably avoided to maintain an excellent sliding property.

The bearing 101 is manufactured through a fired body forming step, an insert molding step, a sizing step, and an oil impregnation step. How, each step is described in detail.

[Fired Body Forming Step]

The carbon-based fired body 103 is formed through use of raw material powder containing carbon-based powder and resin binder powder. As the carbon-based powder, for example, graphite powder, may be used, and specifically, any of natural graphite powder and artificial graphite powder may be used. The natural graphite powder has a feature of being excellent in lubricity because of a scale-like shape. Meanwhile, the artificial graphite powder has a feature of being excellent in moldability because of a lump shape. The carbon-based powder is not limited to graphite powder that is crystal line powder, and amorphous powder, such as pitch powder or coke powder, may also be used as the resin hinder powder, for example, phenol resin powder may be used.

A molding aid, a lubricant, a modifier, or the like is added as necessary to the above-mentioned graphite powder and resin binder powder and uniformly mixed therewith. This mixture is supplied into a mold and subjected to compression molding, to thereby form a compact conforming to the shape of the carbon-based fired body 103. After that, the compact is fired at a furnace temperature of, for example, from 900° C. to 1,000° C., to thereby provide the porous carbon-based fired body 103. The firing is performed in an atmosphere free of oxygen, for example, an atmosphere of inert gas, such as nitrogen gas, or a vacuum atmosphere. This is because, when oxygen is present in the atmosphere, the graphite powder volatilizes as CO or $CO_2$ to dissipate.

As the raw material powder of the carbon-based fired body 103, granulated graphite powder obtained by granulating graphite powder in the presence of a resin binder may also be used instead of the above-mentioned mixed powder of graphite powder and resin binder powder. The granulated graphite powder has a large specific gravity and high flowability as compared to simple substance resin binder or graphite powder. Therefore, the granulated graphite powder is easily supplied into the mold and can be molded into a predetermined shape with high accuracy.

Figure 19:
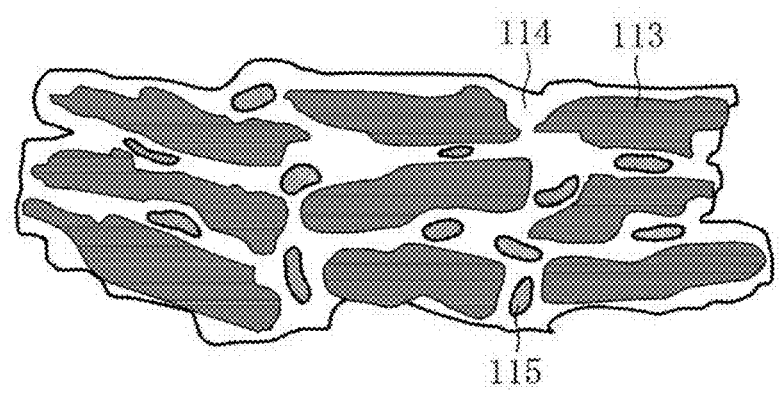
FIG. 19 is an enlarged sectional view of a carbon-based fired body.

FIG. 19 is a schematic view of a microstructure of the carbon-based fired body 103. The resin binder contained in the granulated graphite powder is formed into a carbonization product (amorphous carbon) due to firing, to thereby form a binder component 114 having a network structure. Graphite particles 113 serving as solid lubricant particles derived from the graphite powder are retained in the network of the binder component 114. The graphite particles 113 are retained in the network when the surface of the binder component 114 intertwines with the surfaces of the graphite particles 113. In FIG. 19, a large number of pores formed in the microstructure are denoted by reference numeral 115. On the surface (in particular, the inner side surface 103a) of the carbon-based fired body 103, the graphite particles 113 occupy an area ratio of 60% or more, preferably 80% or more, and hence high lubricity is obtained during sliding with the shaft 102.

[Insert Molding Step]

Figure 20:
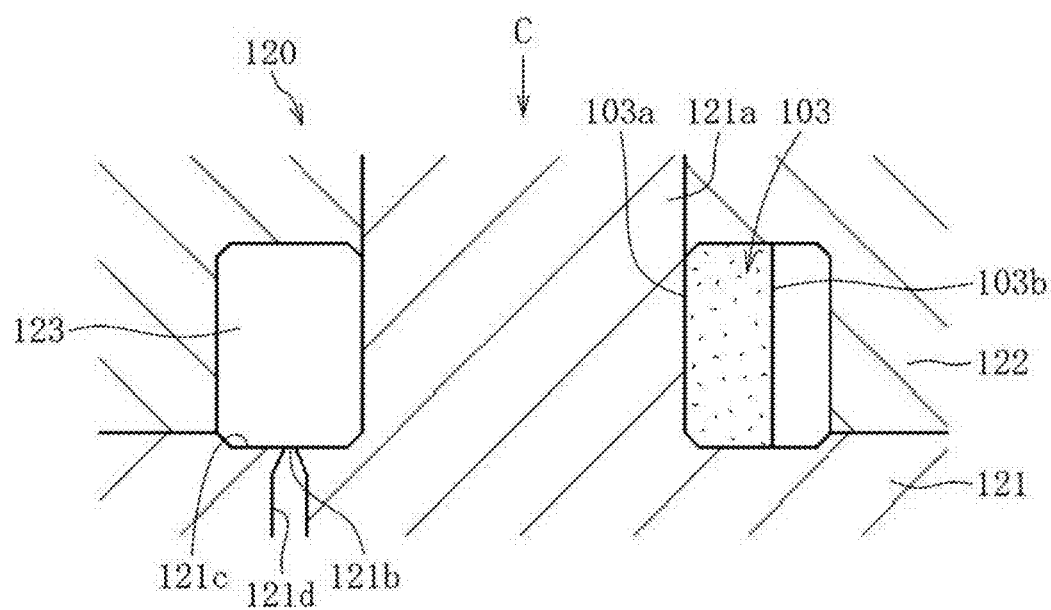
FIG. 20 is a sectional view for illustrating an insert molding step.
Figure 21:
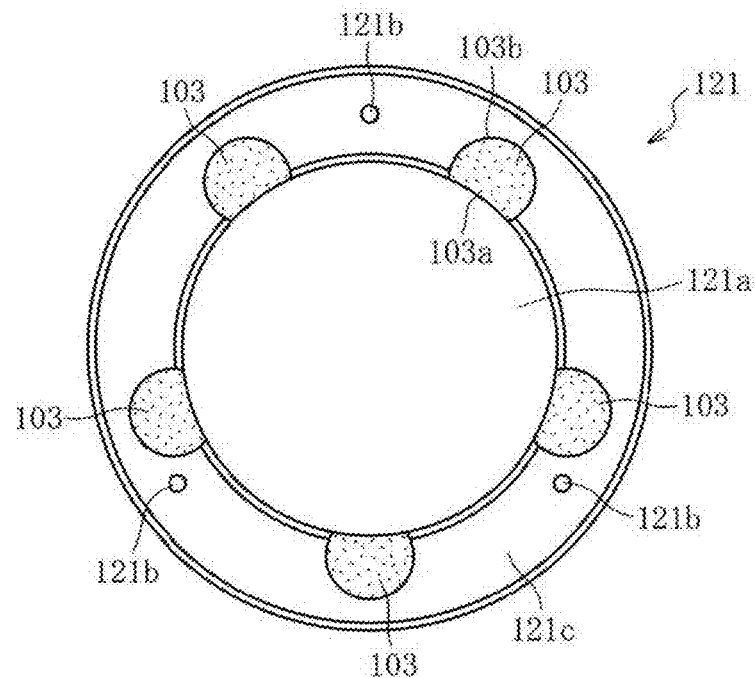
FIG. 21 is a plan view of the insert molding step of FIG. 20 when viewed from a C-direction.

An integrated product of the plurality of carbon-based fired bodies 103 and the resin substrate 104 configured to retain the plurality of carbon-based fired bodies 103 is formed by performing injection molding with a resin through use of the carbon-based fired bodies 103 as an insert component. A mold 120 to be used here comprises a stationary die 121 and a movable die 122 as illustrated in FIG. 20. The stationary die 121 comprises a columnar part 121a, and an outer peripheral surface of the columnar part 121a forms the inner peripheral surface 104a of the resin substrate 104. In the stationary die 121, gates 121b are formed on a molding surface 121c forming an end surface of the resin substrate 104. In this embodiment, a plurality of (three in the illustrated example) gates 121b are arranged at equal intervals in the circumferential direction on the molding surface 121c of the stationary die 121 (see FIG. 21). The kind of the gate is not limited to a point-like gate as in the illustrated example, and for example, an annular film gate may be used.

In the insert molding step, first, the plurality of carbon-based fired bodies 103 are arranged in predetermined portions of an outer periphery of the columnar part 121a of the stationary die 121. Under this state, the movable die 122 and the stationary die 121 are clamped on each other to form a cavity 123, and the plurality of carbon-based fired bodies 103 are arranged in the cavity 123. In this case, each carbon-based fired body 103 is sandwiched between the stationary die 121 and the movable die 122 from both sides in the axial direction. With this, each carbon-based fired body 103 is fixed onto a predetermined portion in the cavity 123 so that the positional displacement of a molten resin during injection is prevented.

Then, the molten resin is injected into the cavity 123 from a runner 121d through the gate 121b, with the result that the cavity 123 is filled with the molten resin. As a synthetic resin serving as a main component (component having the largest weight ratio) of the molten resin, there are given, for example, polyamide (PA), polycarbonate (PC), polybutylene terephthalate (PBT), polyacetal (POM), a liquid crystal polymer (LCP), a wholly aromatic polyester, polyphenylene sulfide (PPS), polyether ether ketone (PEEK), polyamide imide (PAI), polyether imide (PEI), polyimide (PI), fluorine resins (fluorinated polyolefin-based resins), such as a polytetrafluoroethylene-perfluoroalkyl vinyl ether copolymer (PFA), a tetrafluoroethylene-hexafluoropropylene copolymer (FEP), and an ethylene-tetrafluoroethylene copolymer (ETFE), and olefin-based resins, such as polyethylene. Each of those synthetic resins may be used alone, or a polymer alloy of a mixture of two or more kinds thereof may be used.

It is preferred that a crystalline resin be used as a main component of the resin forming the resin substrate 104. The crystalline resin is excellent in mechanical strength and has a large molding contraction ratio as compared to an amorphous resin. When the crystalline resin excellent in mechanical strength is used, the rigidity of the resin substrate 104 is enhanced. Further, when the crystalline resin having a large molding contraction ratio is used, the retaining surface 104b of the resin substrate 104 is reduced in diameter due to the molding contraction during solidification after the molten resin is injected into the cavity, and the resin substrate 104 reliably grabs the carbon-based fired body 103 (described later in detail). Examples of the crystalline resin include LCP, PEEK, PBT, PPS, PA, and POM. For example, at least one or more kinds of crystalline resins selected from a group of crystalline resins consisting of LCP, PEEK, and PPS are excellent in chemical resistance, heat resistance, and the like. In addition, of the crystalline resins, PPS is a particularly preferred material by virtue of its excellence in chemical resistance and cost. In this embodiment, the resin substrate 104 contains PPS as a main component, and is formed of a resin composition containing various fillers. As the PPS, cross-linked PPS, semi-cross-linked PPS, linear PPS, or the like may be used, and for example, linear PPS excellent in toughness is preferably used.

The filler is added in order to improve the friction wear characteristics and reduce a linear expansion coefficient. Specific examples of the filler include: fibers, such as a glass fiber, a carbon fiber, an aramid fiber, an alumina fiber, a polyester fiber, a boron fiber, a silicon carbide fiber, a boron nitride fiber, a silicon nitride fiber, and a metal fiber, and a product produced by weaving any of the fibers into a cloth form; minerals, such as calcium carbonate, talc, silica, clay, and mica; inorganic whiskers, such as an aluminum borate whisker and a potassium titanate whisker; and various heat resistant resins, such as a polyimide resin and polybenzimidazole. Other additives, such as an antistatic agent (for example, carbon nanofiber, carbon black, or graphite), a release agent, a flame retardant, a weatherability improver, an antioxidant, and a pigment, may also be appropriately added.

In this embodiment, a carbon fiber serving as a fibrous reinforcing material and FIFE serving as a solid lubricant are added as the fillers. The blending of the carbon fiber leads to improvement in mechanical strength, such as bending modulus, and the blending of PTFE leads to improvement in sliding characteristics with respect to the shaft 102 or the columnar part 121a of the mold 120. The carbon fiber is roughly classified into a pitch-based carbon fiber and a PAM-based carbon fiber, and any of the carbon fibers may be used. The carbon fiber to be used has, for example, an average fiber diameter of 20 μm or less and an average fiber length of from 0.02 mm to 0.2 mm. The blending ratio of the carbon fiber is, for example, 10 mass % or more and 40 mass % or less, preferably 20 mass % or more and 30 mass % or less with respect to the entirety of the resin substrate 104. The blending ratio of PTFE is, for example, 1 mass % or more and 40 mass % or less, preferably 2 mass % or more and 30 mass % or less with respect to the entirety of the resin substrate 104.

After that, the resin filled into the cavity 123 is cooled to be solidified, to thereby form the resin substrate 104. In this case, due to the molding contraction of the resin, the retaining surface 104b of the resin substrate 104 is reduced in diameter to press the outer side surface 103b of the carbon-based fired body 103 (see the arrow F or FIG. 18A). With this, the retaining surface 104b of the resin substrate 104 and the outer side surface 103b of the carbon-based fired body 103 are brought into close contact with each other with an interference margin, and hence the resin substrate 104 and the carbon-based fired body 103 are strongly fixed onto each other. In this case, when the opening width D0 (that is, the circumferential width of the inner side surface 103a of the carbon-based fired body 103) in the circumferential direction of the retaining surface 104b of the resin substrate 104 is set to be smaller than the maximum width D in the circumferential direction (≈diameter of the carbon-based fired body 103) of the retaining surface 104b, the dropout of the carbon-based fired body 103 onto the radially inner side can be more reliably regulated. When the resin substrate 104 is subjected to molding contraction, the inner peripheral surface 104a of the resin substrate 104 is reduced in diameter as described above. When the carbon-based fired body 103 moves to the radially inner side along with the reduction in diameter of the resin substrate 104, the inner side surface 103a of the carbon-based fired body 103 and the inner peripheral surface 104a of the resin substrate 104 are maintained in a continuous state.

[Sizing Step]

Figures 22A, 22B:
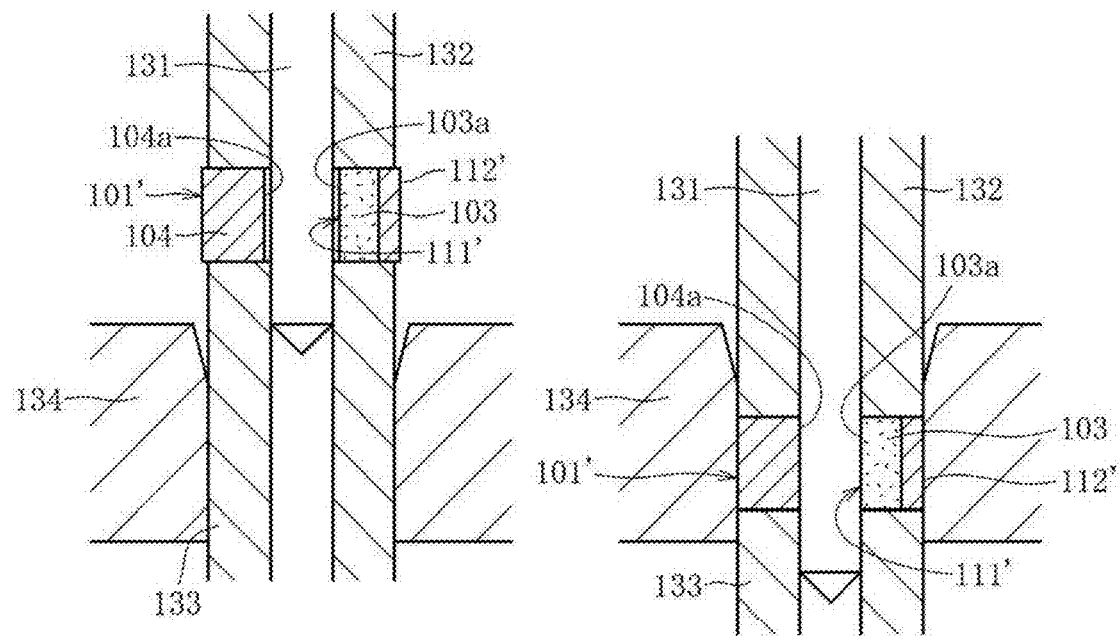
FIG. 22A is a sectional view for illustrating a siring step.
FIG. 22B is a sectional view for illustrating the sizing step.

Next, an integrated product 101' of the carbon-based fired body 103 and the resin substrate 104 is subjected to siring by die molding. Specifically, first, as illustrated in FIG. 22A, a core pin 131 is inserted into an inner periphery of the integrated product 101'. In this case, an inner peripheral surface 111' (the inner side surface 103a of the carbon-based fired body 103 and the inner peripheral surface 104a of the resin substrate 104) of the integrated product 101' and an outer peripheral surface of the core pin 131 are fitted with each other through a slight radial gap. Then, under a state in which an axial width of the integrated product 101' is defined by an upper punch 132 and a lower punch 133, the integrated product 101', the core pin 131, and the upper and lower punches 132 and 133 are integrally lowered to press-fit the integrated product 101' into an inner periphery of a die 134 as illustrated in FIG. 22B. With this, an outer peripheral surface 112' of the integrated product 101' is molded with an inner peripheral surface of the die 134, and the integrated product 101' is simultaneously compressed from an outer periphery, with the result that the inner peripheral surface 111' of the integrated product 101' is pressed against the outer peripheral surface of the core pin 131. With this, the inner peripheral surface 104a of the resin substrate 104 is deformed plastically in conformity with the outer peripheral surface of the core pin 131, and the radial position of each carbon-based fired body 103 is corrected. Specifically, when the plurality of carbon-based fired bodies 103 are pressed against the common core pin 131, each carbon-based fired body 103 is arranged at a predetermined radial position, and the inner side surface 103a of each carbon-based fired body 103 is arranged on the same cylindrical surface.

As described above, when the integrated product 101' of the carbon-based fired body 103 and the resin substrate 104 is subjected to sizing, the surface accuracy (cylindricity and circularity, coaxiality with respect to the outer peripheral surface 112', etc.) of the inner peripheral surface 111' (bearing surface 111) can be enhanced without performing high-accuracy processing with respect to each of the carbon-based fired body 103 and the resin substrate 104. In this embodiment, the carbon-based fired body 103 is mainly formed of carbon (the graphite particles 113 and the binder component 114 made of a carbonization product of a resin binder), and hence plastic deformation hardly occurs. Thus, each carbon-based fired body 103 itself is hardly subjected to sizing, and the surface of the inner side surface 103a pressed against the core pin 131 is slightly adjusted.

[Oil Impregnation Step]

After that, oil is impregnated into the inner pores of the carbon-based fired body 103 of the integrated product 101 (bearing 101) having passed through the sizing step. Specifically, oil is impregnated into the inner pores of the carbon-based fired body 103 by immersing the integrated product 101' into lubricating oil in a reduced-pressure environment and then returning the integrated product 101' to an atmospheric pressure. Thus, the bearing 101 is completed.

The present invention is not limited to the above-mentioned embodiment. How, description is made of other embodiments of the present invention. Redundant description of parts having the same functions as those in the above-mentioned embodiment is omitted.

In the above-mentioned embodiment, there is described the case where the resin serves as a binder for retaining graphite particles of the carbon-based fired body 103. However, the present invention is not limited thereto, and the carbon-based fired body 103 may also be formed of a metal binder. Specifically, for example, raw material powder is used, which contains, as a main component, coated powder in which a part or a whole of the surface of carbon-based powder is coated with a metal. As the coated powder, for example, plated powder in which graphite particles are plated with a metal (non-electrolytic plating) may be used. It is preferred that, for example, copper or nickel be used as the metal with which the graphite particles are coated (hereinafter referred to as "coating metal"). In this embodiment, graphite powder coated with copper in which the surfaces of graphite particles are coated with copper is used as the plated powder.

The ratio of the coating metal in the plated powder is set to about 10 mass % or more and about 80 mass % or less, preferably about 15 mass % or more and about 60 masse or less, more preferably about 20 mass % or more and about 50 mass % or less. When the amount of the coating metal is too small, the ratio of the graphite powder exposed to the surface of the plated powder increases, and the binding strength between particles after firing becomes insufficient. Meanwhile, when the amount of the coating metal is too large, the amount of graphite exposed to the inner side surface 103a of the carbon-based fired body 103 forming the bearing surface 111 decreases, and the lubricity of the carbon-based fired body 103 is degraded. The specific gravity of copper and that of nickel are substantially the same. Therefore, irrespective of whether copper or nickel is used as the coating metal, there is no substantial difference in preferred weight ratio.

As the graphite powder to be used in the plated powder, artificial graphite powder is preferably used. This is because, when natural graphite powder having a scale-like shape is used, it is difficult to sufficiently coat the graphite powder with the coating metal. When the coating of the graphite powder with the coating metal is insufficient, the coating metals of the plated powder cannot foe bound to each other in a later firing step, and hence the strength cannot foe ensured. Particles that are not granulated are preferably used as the graphite particles in order to increase the ratio of graphite in each particle.

When the graphite particles having a small specific gravity are coated with a metal, as described above, the apparent density increases to enhance the flowability of the graphite particles. Therefore, the filling property with respect to the mold is enhanced, and the raw material powder can be uniformly filled into the mold. Further, when the raw material powder is subjected to compression molding, the graphite particles are not deformed plastically. However, when the metals with which each graphite particle is coated are engaged with each other while being deformed plastically, the raw material powder can be molded into a predetermined shape without using a resin binder.

In order to strongly bind the coating metals of the plated powder to each other, a low-melting-point metal is incorporated into the raw material powder. As a procedure for incorporating the low-melting-point metal into the raw material powder, it is conceivable to add simple substance powder of the low-melting-point metal to the plated powder or to precipitate the coating metal alloyed with the low-melting-point metal on the periphery of the graphite particles during plating. The low-melting-point metal is a component that is melted itself during sintering to cause liquid phase sintering to proceed. As the low-melting-point metal, a metal having a melting point lower than the sintering temperature is used. Specifically, a metal having a melting point of 700° C. or less, for example, tin (Sn), zinc (Zn), phosphorus (P), or the like is used. When a general sintered metal, such as a copper-based metal, an iron-based metal, or a copper-iron based metal, is used, Sn having satisfactory compatibility with copper is preferably used.

In this case, the ratio of the low-melting-point metal with respect to the coating metal is set to a range of from 0.3 mass % to 5 mass %, preferably from 0.5 mass % to 3 mass %. When the ratio of the low-melting-point metal is too small, the liquid phase sintering does not proceed, and hence the required strength cannot be obtained. Meanwhile, when the ratio of the low-melting-point metal is too large, the amount of graphite exposed to the inner side surface 103a of the carbon-based fired body 103 forming the bearing surface decreases, and the inner side surface 103a is unnecessarily hardened to degrade the lubricity of the carbon-based fired body 103. Therefore, the above-mentioned ratio is adopted.

A sintering aid and a lubricant are added as necessary to the raw material powder forming the carbon-based fired body 103 in addition to the above-mentioned powders (plated powder and low-melting-point metal powder as necessary).

The raw material powder having the above-mentioned composition is subjected to compression molding to form a compact, and the compact is heated at a sintering temperature that is lower than the melting point of the coating metal and higher than the melting point of the low-melting-point metal, to thereby provide a sintered body (carbon-based fired body 103). Specifically, the low-melting-point metal (for example, tin) in the raw material powder is melted, and a part of the molten low-melting-point metal diffuses into the coating metal, to thereby form an alloy layer on the surface of the coating metal. The alloy layers are subjected to diffusion joining in a solid phase state, with the result that the plated powders are bound to each other. Further, of the molten low-melting-point metals, those which have not diffused into the coating metal are solidified between the plated powders to serve as paste or the like, to thereby contribute to the enhancement of the binding force between the plated powders.

When the raw material powder of the compact contains a resin binder, the resin binder is decomposed to generate decomposed gas during firing, and a dimensional change caused by the dissipation of the resin binder due to firing increases. In order to suppress the generation of the decomposed gas and the dimensional change, it is necessary to heat the compact over a long time period to cause firing to proceed slowly. In contrast, in this embodiment, the compact does not contain the resin binder as described above, and hence sintering can be performed within a relatively short time period, and the productivity can be increased.

Figure 23:
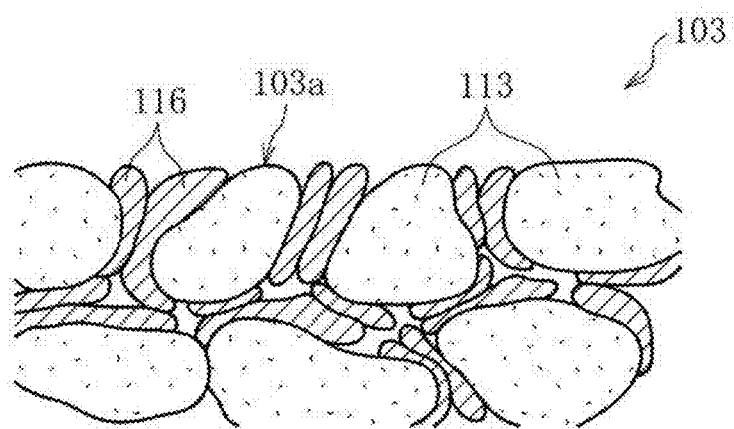
FIG. 23 is an enlarged sectional view of a carbon-based fired body of a sliding member according to another embodiment.
Figure 24:
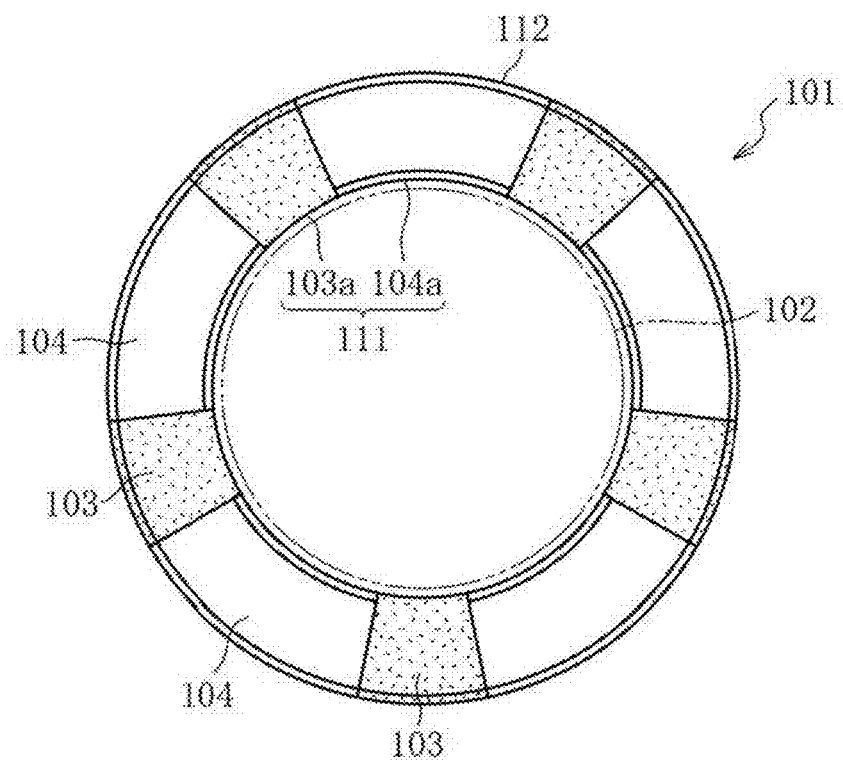
FIG. 24 is a front view for illustrating a sliding member according to another embodiment.

The carbon-based fired body 103 thus formed has a structure in which the graphite particles 113 are retained in a network in which copper 116 serving as the coating metal is bound to each other by sintering as illustrated in FIG. 23. In FIG. 23, the illustration of the low-melting-point metal is omitted.

In the later insert molding step, an integrated product in which the carbon-based fired body 103 is retained by the resin substrate 104 is formed, and the integrated product is subjected to a siring step. As illustrated in FIG. 23, in the carbon-based fired body 103 of this embodiment, the copper 116 that is easily deformed plastically is interposed between the graphite particles 113, and hence the carbon-based fired body 103 can be subjected to siring by die molding. Thus, in the sizing step, the inner side surface 103a of the carbon-based fired body 103 as well as the inner peripheral surface 104a of the resin substrate 104 is subjected to siring, and hence the surface accuracy of the bearing surface 111 can be even further enhanced.

In the above-mentioned embodiment, there is described the case where the carbon-based fired body 103 is exposed to only the inner peripheral surface (bearing surface 111) of the bearing 101, but the present invention is not limited thereto. For example, in an embodiment illustrated in FIG. 24, the carbon-based fired body 103 is exposed to the outer peripheral surface 112 as well as the inner peripheral surface of the bearing 101. In this case, each carbon-based fired body 103 can be compressed from both sides in the radial direction in the sizing step, and hence sizing is easily performed. In this embodiment, it is preferred that the carbon-based fired body 103 using the metal binder illustrated in FIG. 23 be used.

Figure 25:
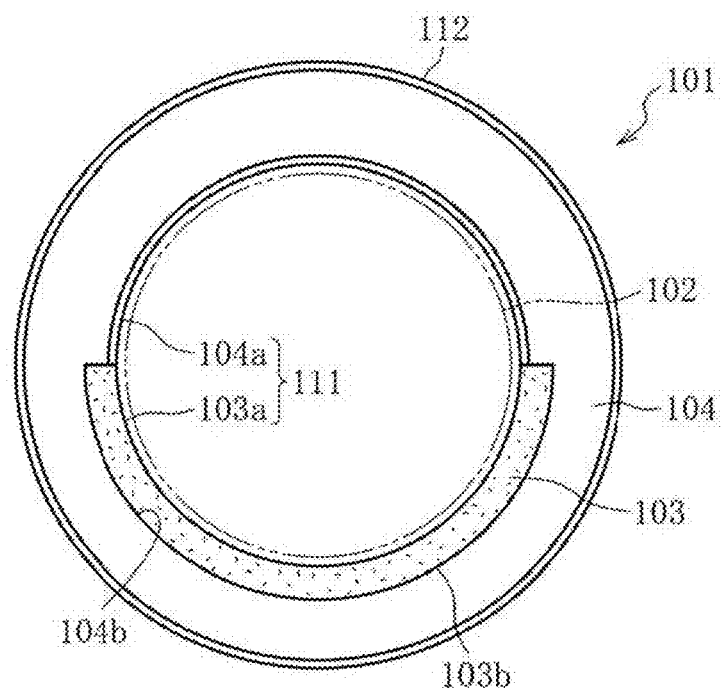
FIG. 25 is a front view for illustrating a sliding member according to another embodiment.
Figure 26:
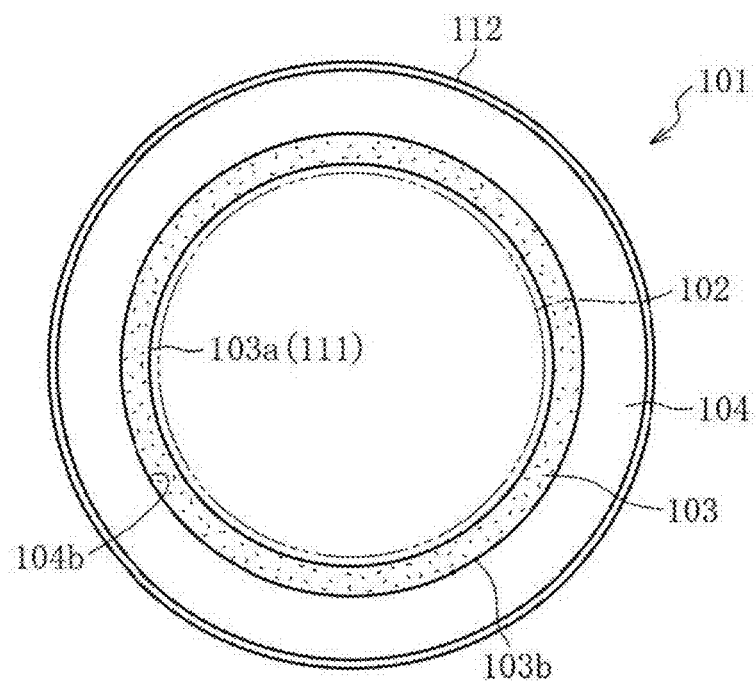
FIG. 26 is a front view for illustrating a sliding member according to another embodiment.

Further, in the above-mentioned embodiment, there is described the case where the plurality of carbon-based fired bodies 103 are arranged at equal intervals in the circumferential direction, but the present invention is not limited thereto. For example, as illustrated in FIG. 25, the carbon-based fired body 103 having a semi-cylindrical shape that continues in the circumferential direction may be arranged so as to cover a substantially half periphery of the bearing surface 111. Alternatively, as illustrated in FIG. 26, the carbon-based fired body 103 having a cylindrical shape may cover the entire periphery of the bearing surface 111.

Figure 27:
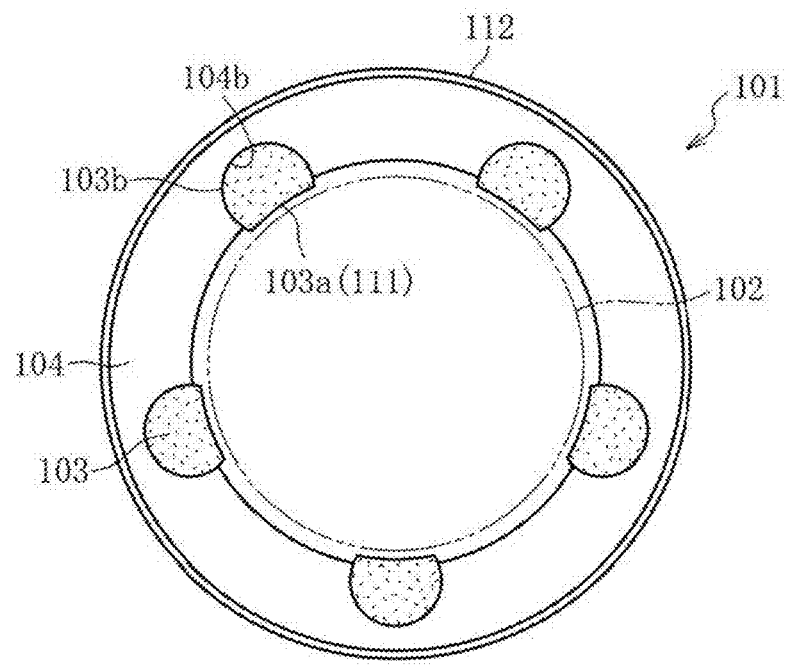
FIG. 27 is a front view for illustrating a gliding member according to another embodiment.

Further, in the above-mentioned embodiment r there is described the case where the inner side surface 103a of the carbon-based fired body 103 and the inner peripheral surface 104a of the resin substrate 104 are arranged on the same cylindrical surface and form the bearing surface 111, but the present invention is not limited thereto. For example, as illustrated in FIG. 27, the inner side surface 103a of the carbon-based fired body 103 may be arranged on the radially inner side from the inner peripheral surface 104a of the resin substrate 104 to form the bearing surface 111 only of the inner, side surface 103a of the carbon-based fired body 103. In this case, the inner side surfaces 103a of the plurality of carbon-based fired bodies 103 are arranged on the same cylindrical surface.

Further, the carbon-based fired bodies 103 may be arranged only in a partial region of the axial direction instead of being arranged over the entire axial length of the bearing 101 as illustrated in FIG. 18B, and the carbon-based fired bodies 103 may be arranged, for example, in a plurality of portions isolated in the axial direction.

Further, the present invention is not limited to the bearing configured to support the relative rotation of the shaft, and can also be applied to a bearing configured to support the axial motion of the shaft. Further, the present invention is not limited to the cylindrical sliding member, and can also be applied to a sliding member having another shape (for example, a semi-cylindrical shape or a rectangular box shape).

The sliding member according to the present invention can be used as a gear wheel having a sliding surface on an inner peripheral surface.

Figure 28:
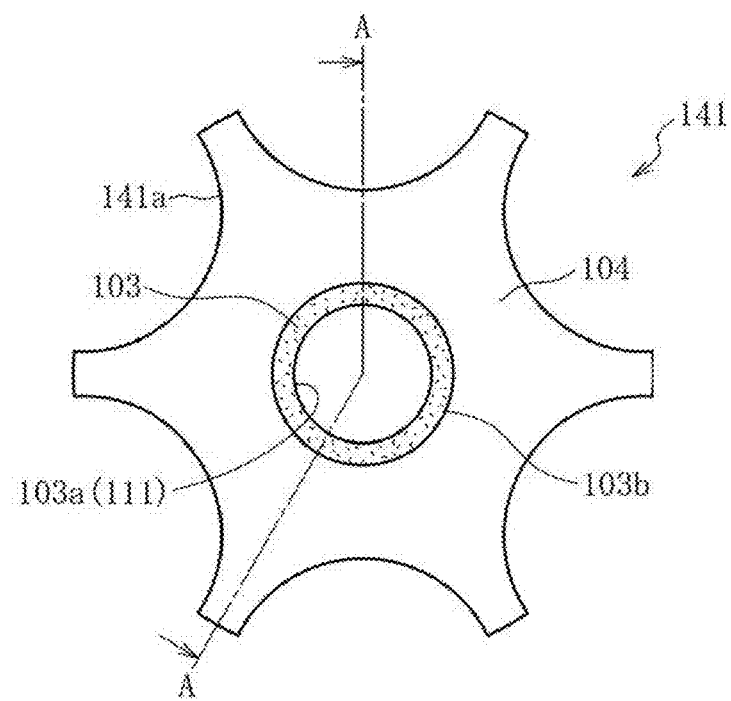
FIG. 28 is a front view of a sliding member according to another embodiment (inner rotor for a fuel pump).
Figure 29:
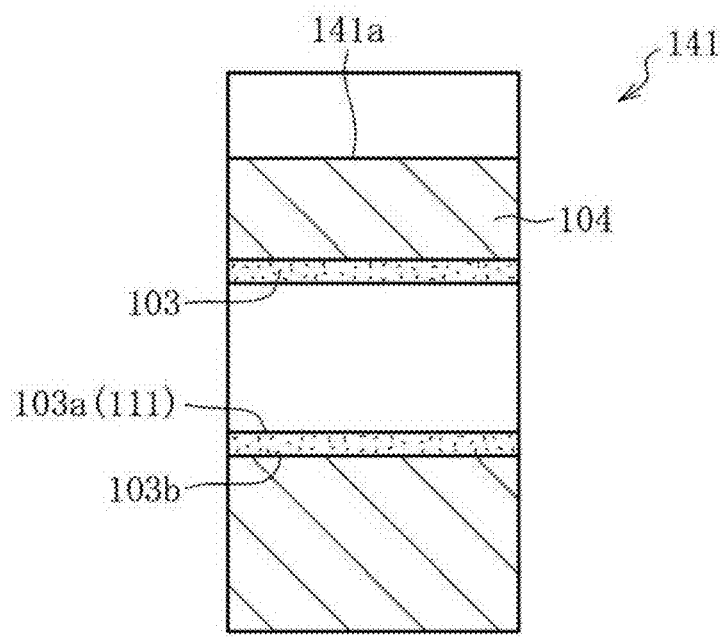
FIG. 29 is a sectional view taken along the line A-A of the sliding member of FIG. 28.
Figure 31:
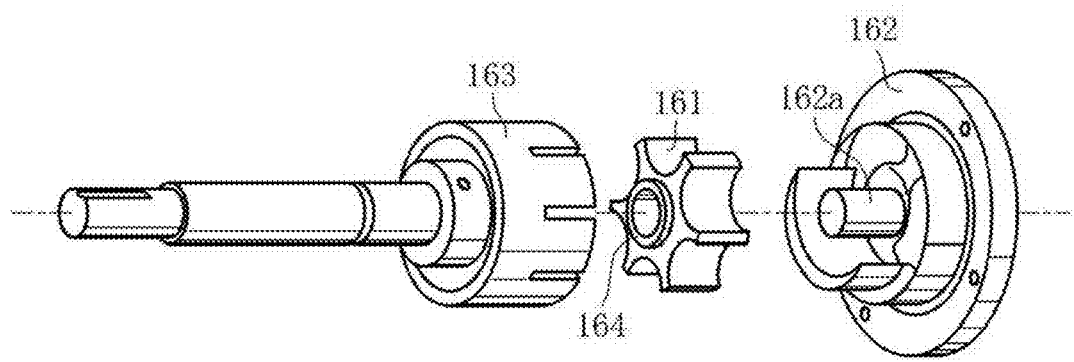
FIG. 31 is an exploded perspective view of an internal gear pump.

The sliding member according to the present invention can be used as, for example, a gear wheel for a fuel pump, in particular, an inner rotor 141 to be incorporated into a positive-displacement rotary gear pump as illustrated in FIG. 31. As illustrated in FIG. 28 and FIG. 29, the inner rotor 141 comprises the carbon-based fired body 103 containing carbon as a main component and the resin substrate 104 configured to retain the carbon-based fired body 103. In this embodiment, the carbon-based fired body 103 is formed into a cylindrical, shape, and the entire surface of the outer peripheral surface 103b of the carbon-based fired body 103 is retained by the resin substrate 104. The inner peripheral surface 103a of the carbon-based fired body 103 is exposed to an inner peripheral surface of the inner rotor 141 and serves as the bearing surface 111 that slides with an outer peripheral surface of the fixing shaft 162a (see FIG. 31). A tooth surface 141a that is engaged with the outer rotor 163 (see FIG. 31) is formed on the outer peripheral surface of the resin substrate 104. The inner rotor 141 is manufactured through the fired body forming step and the insert, molding step. Further, an integrated product of the carbon-based tired body 103 and the resin substrate 104 obtained in the insert molding step is subjected to a sizing step as necessary. Each step is the same as that of the above-mentioned embodiments, and hence overlapping description of the same part is omitted.

Further, the sliding member according to the present invention can be used as a planetary gear 151 (see FIG. 30) forming a planetary gear reducer. The planetary gear 151 is arranged in a plurality of portions in the circumferential direction between a sun gear and an internal gear (not shown), which are coaxially arranged, in the radial direction, and each planetary gear 151 is engaged with both the sun gear and the internal gear.

Figure 30:
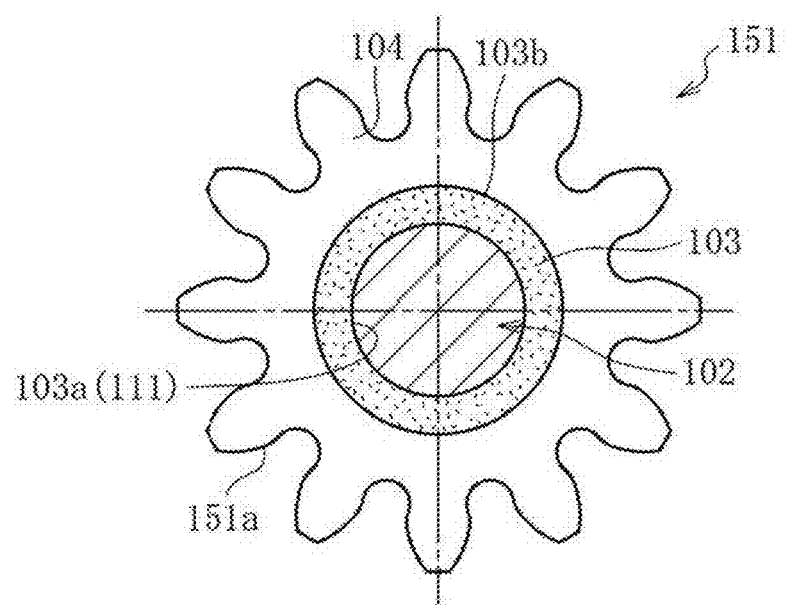
FIG. 30 is a front view of a sliding member according to another embodiment (planetary gear).

As illustrated in FIG. 30, the planetary gear 151 comprises the carbon-based fired body 103 containing carbon as a main component and the resin substrate 104 configured to retain the carbon-based fired body 103. In the illustrated example, the carbon-based fired body 103 is formed into a cylindrical shape, and the entire surface of the outer peripheral surface 103*b* of the carbon-based fired body 103 is retained by the resin substrate 104. The inner peripheral surface 103*a* of the carbon-based fired body 103 is exposed to an inner peripheral surface of the planetary gear 151 and serves as the bearing surface 111 that slides with an outer peripheral, surface of the shaft 102. A tooth surface 151*a* that is engaged with the sun gear and the internal gear is formed on the outer peripheral surface of the resin substrate 104. The planetary gear 151 is manufactured through the fired body forming step and the insert molding step. Further, an integrated product of the carbon-based fired body 103 and the resin substrate 104 obtained in the insert molding step is subjected to one or both of a sizing step and an oil impregnation step as necessary. Each step is the same as that of the above-mentioned embodiments, and hence overlapping description of the same part is omitted.

Next, a sliding member according to an embodiment of a third invention of the present application is described with reference to FIG. 32 and FIG. 33.

The sliding member is manufactured through: a compacting step of subjecting raw material powder to compression molding, to thereby provide a compact; a sintering step of sintering the compact to provide a sintered body; and a sizing step of subjecting the sintered body to sizing by recompression. Now, each step is described in detail.

(1) Compacting Step

First, various powders containing graphite particles, a binder metal, and a low-melting-point metal are mixed to prepare raw material powder.

As the graphite particles, artificial graphite or natural graphite may be used. It is preferred that the graphite particles have a granular shape (excluding scale-shaped graphite and earthy graphite). In this embodiment, the granular artificial graphite is used. Further, both the graphite particles that are not granulated and the graphite particles that are granulated may be used. In order to granulate the graphite particles, a binder for binding each graphite particle is required to decrease the ratio of graphite in each particle. Therefore, it is preferred that the graphite particles that are not granulated be used.

The binder metal adheres to the surface of each graphite particle. As the binder metal, a metal having a melting point higher than a sintering temperature described later is used. A material that has hardness lower than that of the graphite particles and is easily deformed plastically is used as the binder metal. Specifically, as the binder metal, for example, copper or nickel may be used, and copper is used in this embodiment.

As the low-melting-point metal, a metal having a melting point lower than the sintering temperature described later is used. As the low-melting-point metal, for example, tin or zinc may be used, and tin is used in this embodiment.

Figure 32A:
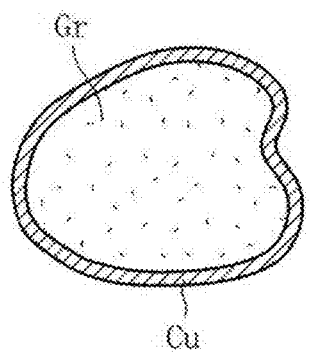
FIG. 32A is a sectional view of a particle of graphite powder having copper adhering thereto in which the entire surface of a graphite particle is coated with copper.
Figure 32B:
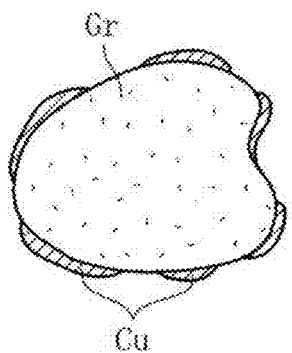
FIG. 32B is a sectional view of a particle of graphite powder having copper adhering thereto in which a part of the surface of the graphite particle is coated with copper.

The raw material powder is prepared by, for example, mixing graphite powder, having copper adhering thereto in which copper adheres as a binder metal to the surface of each graphite particle and tin powder serving as a low-melting-point metal. In this embodiment, graphite powder plated with copper in which the surface of each graphite particle is plated with copper is used as the graphite powder having copper adhering thereto. Further, as the graphite powder having copper adhering thereto, for example, graphite powder in which the entire surface of a graphite particle (Gr) is coated with copper (Cu) as illustrated in FIG. 32A may be used. Alternatively, as the graphite powder having copper adhering thereto, Graphite powder in which copper (Cu) is dispersed in an island manner onto the surface of the graphite particle (Gr) to adhere thereto as illustrated in FIG. 32B may be used. The graphite powder having copper adhering thereto illustrated in FIG. 32A and the graphite powder having copper adhering thereto illustrated in FIG. 32B may each be used alone, or may be mixed with each other. In this embodiment, the graphite powder having copper adhering thereto illustrated in FIG. 32B is used alone.

The above-mentioned raw material powder is filled into a mold. In general, the fineness of the graphite particles is very high. Therefore, the flowability of the graphite particles is unsatisfactory, and the filling property thereof with respect to the mold is unsatisfactory. In this embodiment, when copper is caused to adhere to the graphite particles, the apparent density increases to enhance the flowability of the graphite particles. Therefore, the filling property with respect to the mold is enhanced, and the raw material powder can be uniformly filled into the mold.

When the raw material powder filled into the mold as described above is subjected to compression molding, a compact is formed. In this case, the graphite particles are not deformed plastically. However, when copper adhering to each graphite particle is engaged with each other while being deformed plastically, the raw material powder can be molded into a predetermined shape. With this, a compact containing the graphite particles as a main component can be formed without using a binding agent, such as tar pitch or coal tar.

(2) Sintering Step

Next, the compact obtained in the above-mentioned compacting step is heated in a sintering furnace, with the result that copper adhering to each graphite powder is bound to each other by sintering, to thereby form a sintered body. Specifically, when the compact is heated, tin powder contained in the compact is melted, and a part thereof diffuses into the surface layer of copper adhering to each graphite particle, to thereby form a copper-tin alloy layer on the surface of copper. The copper-tin alloy layers are subjected to diffusion joining in a solid phase state, with the result that the graphite powders plated with copper are bound to each other to form a sintered body. The sintering temperature in this case is lower than the melting point of copper and higher than the melting point of tin.

When the compact contains a binding agent, such as tar pitch or coal tar, as in the related-art lubricating member, decomposed gas of the binding agent is generated during sintering, and the binding agent almost dissipates due to sintering. Therefore, a dimensional change caused by sintering (difference in dimension between the compact and the sintered body) increases. In this case, when sintering is performed rapidly within a short time period, there is a risk in that cracks and the like may occur in the sintered body due to a rapid dimensional change, and hence it is necessary to heat the compact over a long time period to cause sintering to proceed slowly. In contrast, in this embodiment, the compact does not contain the binding agent, such as tar pitch or coal tar, as described above, and hence the decomposed gas of the binding agent is not generated during sintering, and the dimensional change caused by sintering can be suppressed. Thus, the concern about the cracks and the like of the sintered body is small, and the sintering time can be relatively shortened.

(3) Sizing Step

When the compact is sintered as described above, contraction occurs. Therefore, it is desired that the sintered body be subjected to sizing after sintering. For example, the related-art lubricating member obtained by firing a compact containing graphite particles and a binding agent is brought into a state in which the graphite particles are bound to each, other with a binding agent carbonized by firing. When the lubricating member is subjected to sizing, the graphite particles themselves are hardly deformed plastically as described above, and hence there is a high risk in that the lubricating member may be broken. Therefore, the sizing of the related-art lubricating member needs to be performed by mechanical processing, with the result that there are problems of an increase in cost and a decrease in productivity.

The sintered body of this embodiment contains the binder metal between the graphite particles. Therefore, when the sintered body is subjected to sizing, the sizing can be performed while the binder metal is deformed plastically. Specifically, when the sintered body is compressed with a sizing die (die, core, upper punch, and lower punch), the sintered body is subjected to siring to desired dimensions. With this, shaping by mechanical processing as in the related-art lubricating member is not required. Thus, the cost is reduced, and the productivity is increased. With the foregoing, the lubricating member is completed.

In the sizing step, the sintered body and the die and core of the siring die slide with each other in a pressure contact state. With this, copper of the graphite powder plated with copper that is exposed to the surface of the sintered body can be peeled from the graphite particles to increase the ratio of the graphite particles exposed to the surface of the sintered body. Thus, when a portion of the sintered body serving as the sliding surface is caused to slide with the sizing die in a pressure contact state, the ratio of the graphite particles exposed to the sliding surface can be increased to enhance the sliding property. Needless to say, when it is not necessary to peel copper of the graphite powder plated with copper of the sliding surface by sizing as described above, the portion of the sintered body serving as the sliding surface may be brought into abutment against a surface (for example, end surfaces of the upper and lower punches) that do not slide with the sizing die.

Figure 33:
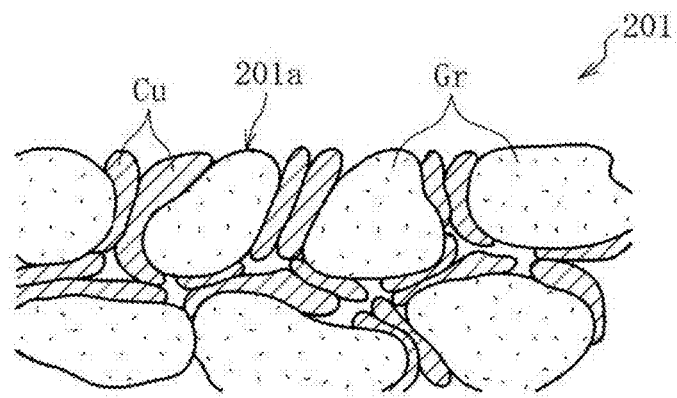
FIG. 33 is an enlarged sectional view of the vicinity of a sliding surface of a sliding member according to an embodiment of a third invention of the present application.

As illustrated in an enlarged state in FIG. 33, a lubricating member 201 formed as described above contains graphite particles (Gr), copper (Cu) serving as a binder metal, and tin (Sn) serving as a low-melting-point metal. In FIG. 33, the graphite particles (Gr) are represented by scattered points, copper (Cu) is represented by hatching, and tin (Sn) is not shown.

Copper adhering to each graphite particle is bound to each other by sintering. Copper is not melted at the sintering temperature and is bound to copper adhering to the other graphite particles in a solid phase state. Specifically, a part or a whole of tin melted by sintering diffuses into copper, to thereby form a copper-tin alloy layer on a surface layer, and the copper-tin alloy (bronze) regions are subjected to diffusion joining. Further, of tin melted by sintering, those which have not diffused into copper are solidified between copper adhering to each graphite particle to serve as paste or the like, to thereby contribute to the enhancement of the binding force between copper.

On the surface of the lubricating member 201, in particular, the sliding surface 201a that slides with another component, the graphite particles occupy the largest area, and the area ratio of the graphite particles on the sliding surface is, for example, 50% or more, preferably 80% or more, more preferably 30% or more. In this embodiment, the lubricating member 201 contains the graphite particles in the largest volume ratio and contains the graphite particles in a volume ratio of, for example, 50% or more.

As described above, the graphite particles are exposed to the sliding surface in a large amount, with the result that the sliding property between the lubricating member 201 and the mating member is enhanced due to the self-lubricity of the graphite. Therefore, the lubricating member 201 is preferably used as a lubricating member that slides with a mating member in a non-lubricating environment (that is, without interposing a lubricant, such as oil). Specifically, the lubricating member 201 can be used as, for example, a rotor and a vane for a vacuum pump, a bearing to be used in a high-temperature environment exceeding 200° C., or a bearing for a construction machine. The lubricating member 201 is not limited to an application to be used in a non-lubricating environment, and can also be used in an application to be used in a lubricating environment in which the lubricating member 201 slides with a mating member through intermediation of a lubricant, such as oil.

The present invention is not limited to the above-mentioned embodiments. For example, in the above-mentioned embodiments, the raw material powder is formed of graphite, powder having copper adhering thereto and tin powder. However, the present invention is not limited, thereto, and for example, powder further having a low-melting-point metal adhering to the surface of a binder metal adhering to graphite powder may be used. For example, powder may be used, which is obtained by subjecting graphite powder plated with copper further to tin plating, to thereby cause tin to adhere to the surface of copper.

Further, in the above-mentioned embodiments, there is described the case where the lubricating member is made of graphite particles, a binder metal, and a low-melting-point metal, but the lubricating member may further contain another metal, such as iron.

Further, in the above-mentioned embodiments, there is described the case where the sintered component contains a low-melting-point metal, but the low-melting-point metal may be omitted when the low-melting-point metal is not particularly required. In this case, copper adhering to each graphite particle does not form an alloy layer, and pure copper is subjected to diffusion joining by sintering.

Further, in the above-mentioned embodiments, there is described the case where the sintered body is subjected to siring treatment, but the sizing treatment may be omitted when the sizing treatment is not particularly required.

The configurations of the embodiments of the first invention, the second invention, and the third invention of the present application described above may be combined appropriately. For example, the lubricating member according to the embodiment of the third invention of the present application may be used as the sliding member (bearing, etc.) according to the embodiment of the first invention or the second invention of the present application.

REFERENCE SIGNS LIST

1 sintered bearing (sliding member)
2 shaft (mating member)
3 metal substrate
4 lubricating member
5 resin binder
6 graphite powder (solid lubricant powder)
8 coating metal (metal)
9 plated powder (coated powder)
11 bearing surface (sliding surface)
13 graphite particle (solid lubricant particle)
52 inner rotor (sliding member)
F contraction force

The invention claimed is:

1. A sliding member having a sliding surface that slides with a mating member, comprising:
   a metal substrate, which is formed by sintering raw material powder containing metal powder as a main component, the metal powder containing copper and iron as main components; and
   a lubricating member, which is made of a sintered body of coated powder formed by coating graphite powder with copper,
   wherein at least a part of the sliding surface is formed of the lubricating member,
   wherein the metal powder of the metal substrate is bonded to each other through copper-tin alloy,
   wherein the coated powder of the lubricating member is bonded to each other through copper-tin alloy, and
   wherein the metal powder of the metal substrate and the coated powder of the lubricating member are bonded to each other through copper-tin alloy.

2. The sliding member according to claim 1, wherein the sliding surface is subjected to sizing.

* * * * *